(12) United States Patent
Kondo et al.

(10) Patent No.: US 8,295,516 B2
(45) Date of Patent: Oct. 23, 2012

(54) SYSTEM, APPARATUS, METHOD AND PROGRAM FOR CONTROLLING OUTPUT

(75) Inventors: Tetsujiro Kondo, Tokyo (JP); Akihiko Arimitsu, Kanagawa (JP); Junichi Shima, Kanagawa (JP); Takuro Ema, Tokyo (JP)

(73) Assignee: Sony Corporation, Tokyo (JP)

( * ) Notice: Subject to any disclaimer, the term of this patent is extended or adjusted under 35 U.S.C. 154(b) by 1407 days.

(21) Appl. No.: 11/872,954

(22) Filed: Oct. 16, 2007

(65) Prior Publication Data
US 2008/0165992 A1 Jul. 10, 2008

(30) Foreign Application Priority Data

Oct. 23, 2006 (JP) ................. 2006-287741

(51) Int. Cl.
*H04R 5/02* (2006.01)
*H04R 1/02* (2006.01)
*H04R 9/06* (2006.01)
*H04N 7/14* (2006.01)
(52) U.S. Cl. ...... 381/306; 381/310; 381/333; 348/14.07
(58) Field of Classification Search .................. 381/310, 381/333, 306, 123, 82; 348/14.07, 14.08; 463/35; 352/11
See application file for complete search history.

(56) References Cited

U.S. PATENT DOCUMENTS

| | | | |
|---|---|---|---|
| 2004/0090391 | A1 | 5/2004 | Kondo |
| 2006/0126878 | A1 | 6/2006 | Takumai et al. |
| 2006/0210093 | A1* | 9/2006 | Ishibashi et al. ............. 381/80 |

FOREIGN PATENT DOCUMENTS

| | | |
|---|---|---|
| JP | 6-38122 | 2/1994 |
| JP | 2003-198989 | 7/2003 |
| JP | 2003-244674 | 8/2003 |
| JP | 2004-289866 | 10/2004 |
| JP | 2005-64746 | 3/2005 |
| JP | 2005-175744 | 6/2005 |
| JP | 2006-67218 | 3/2006 |

OTHER PUBLICATIONS

Office Action issued Dec. 20, 2011, in Japanese Patent Application No. 2006-287741.

* cited by examiner

*Primary Examiner* — Vivian Chin
*Assistant Examiner* — Douglas Suthers
(74) *Attorney, Agent, or Firm* — Oblon, Spivak, McClelland, Maier & Neustadt, L.L.P.

(57) ABSTRACT

An output control system includes a plurality of output control apparatuses, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus. Each of the output control apparatuses includes a communication unit for exchanging information relating to one of a state and a process result of own apparatus with another output control apparatus, and a signal processing unit for processing an audio signal to be output to the corresponding loudspeaker based on the information relating to the other output control apparatus received via the communication unit.

16 Claims, 19 Drawing Sheets

FIG. 5

| LOUDSPEAKER NAME | VOLUME PARAMETER | DELAY PARAMETER |
|---|---|---|
| LOUDSPEAKER 12L-4 | 0.5 | 0 |
| LOUDSPEAKER 12R-4 | 0.5 | 50 |
| LOUDSPEAKER 12L-1<br>LOUDSPEAKER 12R-1 | 0.9 | 0 |
| LOUDSPEAKER 12L-7<br>LOUDSPEAKER 12R-7 | 0.4 | 0 |

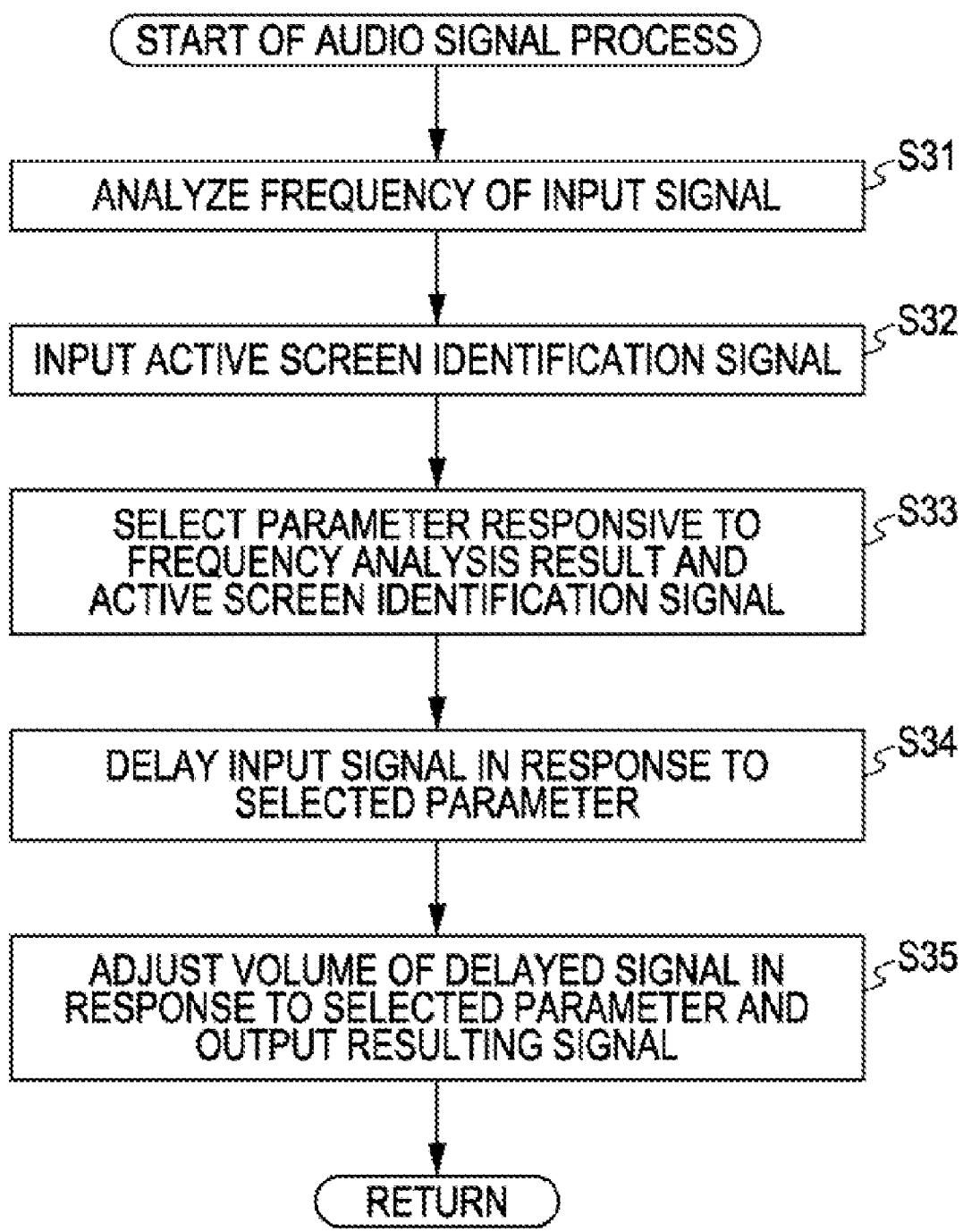

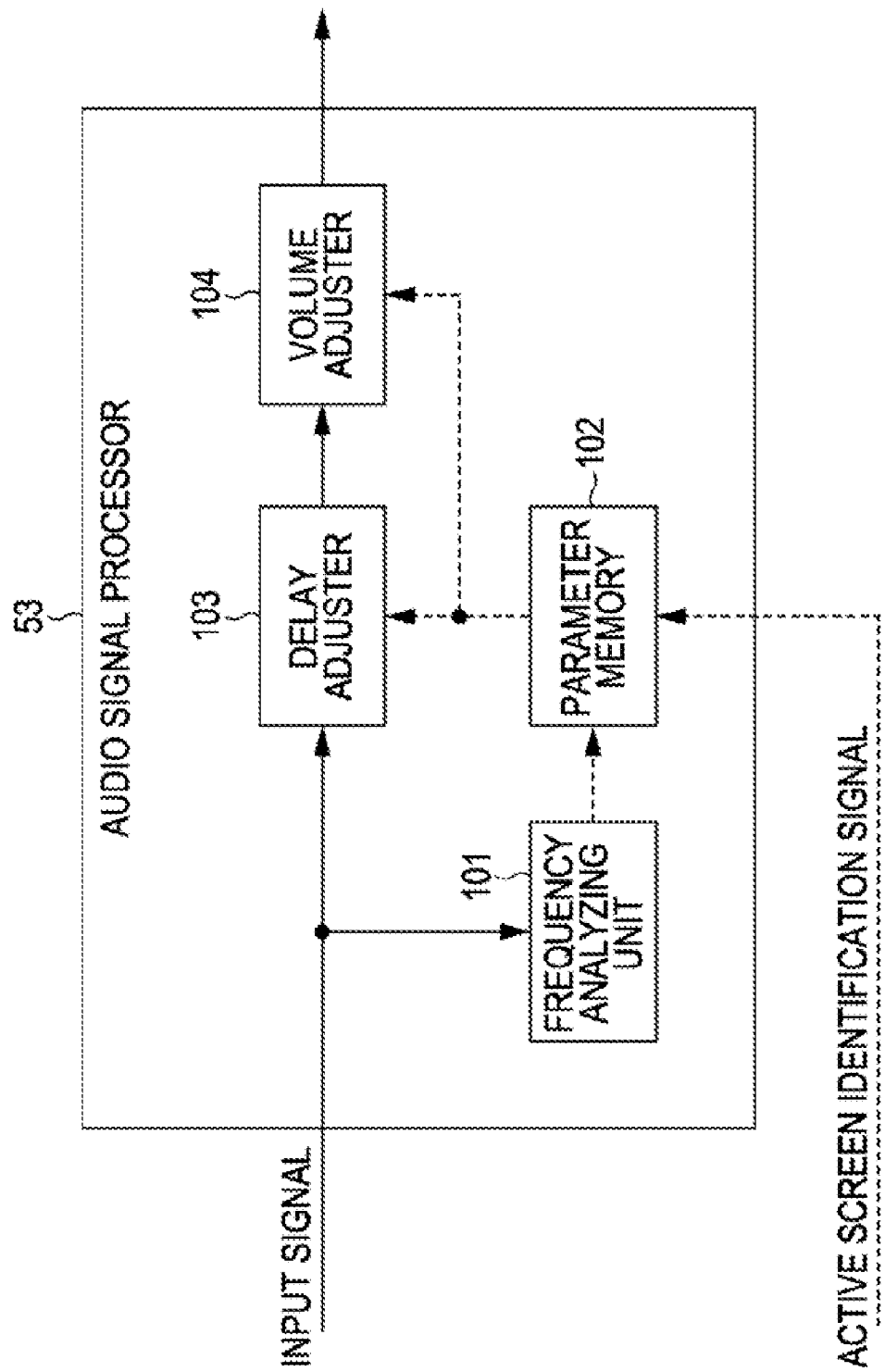

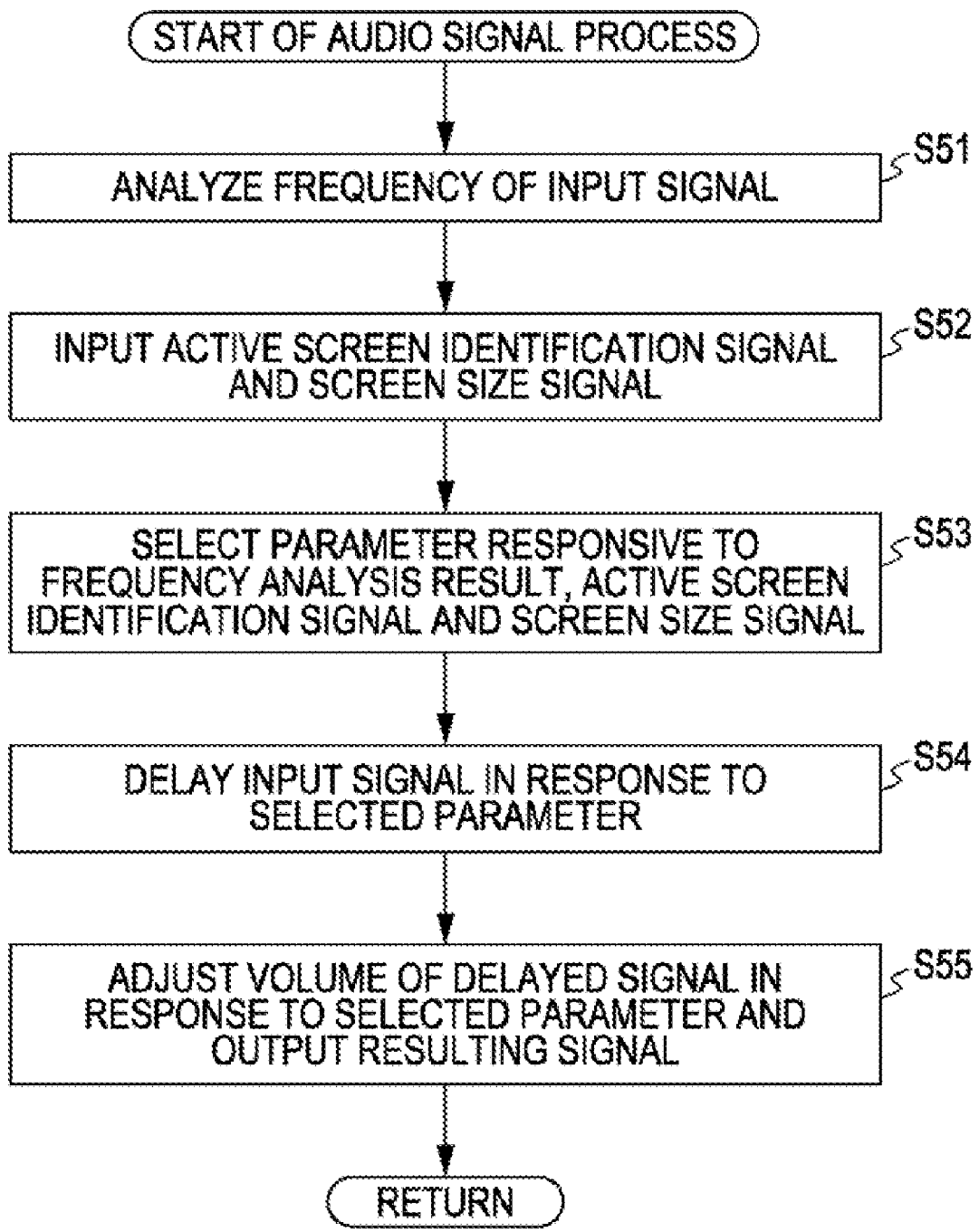

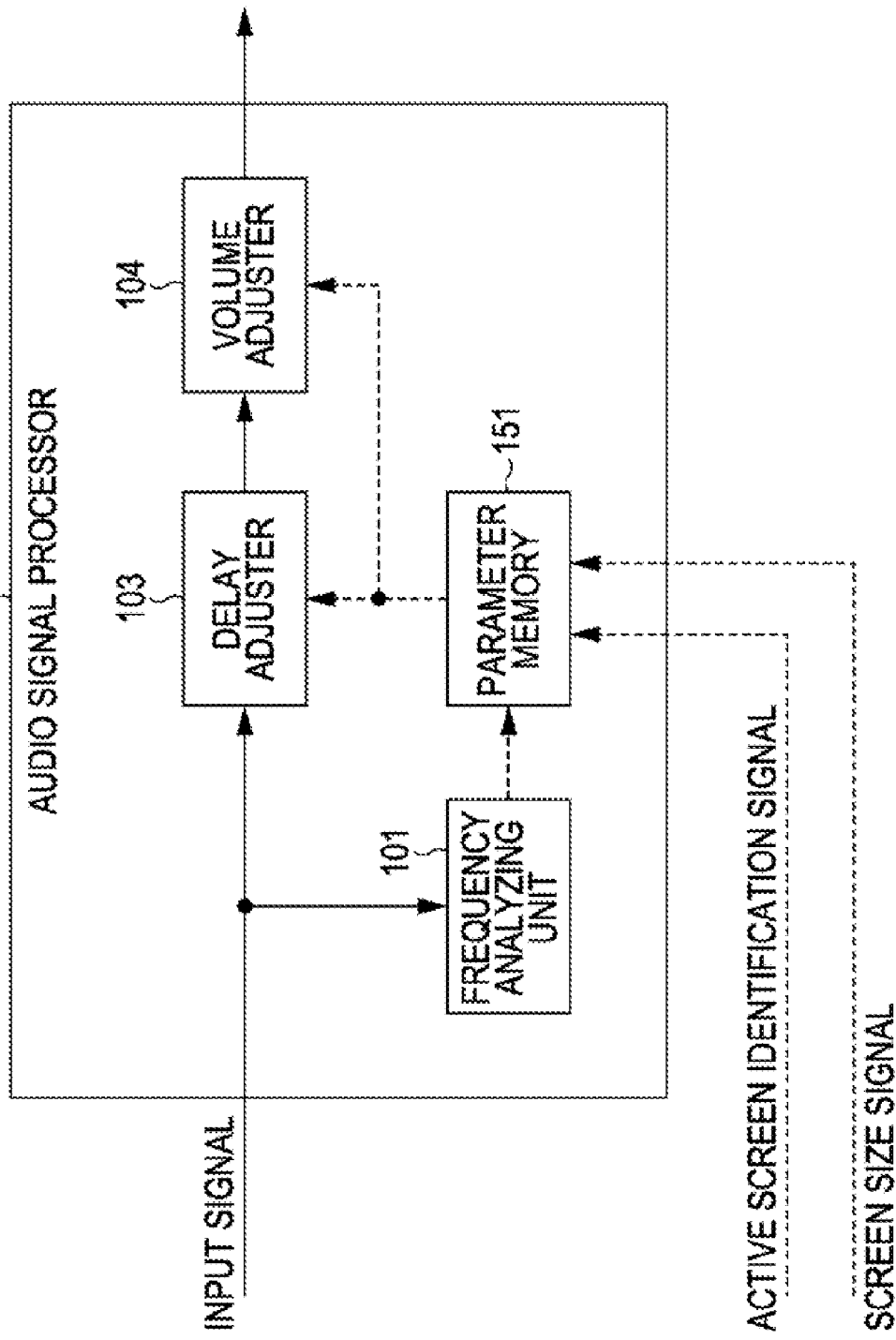

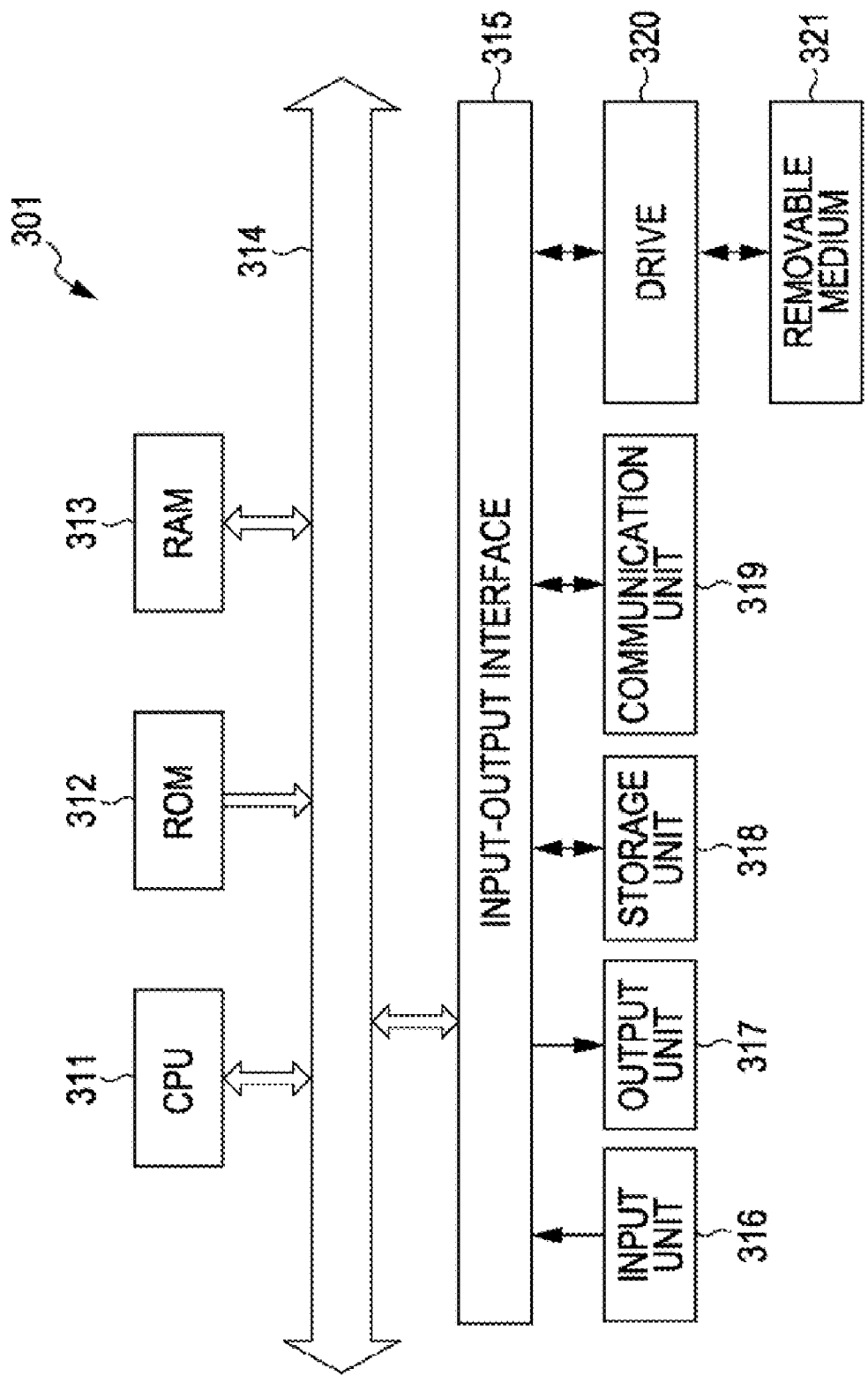

SYSTEM, APPARATUS, METHOD AND PROGRAM FOR CONTROLLING OUTPUT

CROSS REFERENCES TO RELATED APPLICATIONS

The present invention contains subject matter related to Japanese Patent Application JP 2006-287741 filed in the Japanese Patent Office on Oct. 23, 2006, the entire contents of which are incorporated herein by reference.

BACKGROUND OF THE INVENTION

1. Field of the Invention

The present invention relates to a system, apparatus, method and program for controlling output and, in particular, to a system, apparatus, method and program for processing an audio signal responsive to a multi-display apparatus.

2. Description of the Related Art

Techniques for forming virtual sound sources at positions surrounding a listener with a plurality of loudspeakers are available as disclosed in Japanese Unexamined Patent Application Publication No. 2005-64746.

Scalable television technique is becoming used. In the scalable television technique, television receivers looking in the same direction are arranged with one above another or side by side. Not only different images are displayed on the respective television receivers, but also a whole image is displayed in enlargement on the television receivers, or partitioned in desired sizes and displayed on the television receiver.

Japanese Unexamined Patent Application Publication No. 2004-289866 discloses one technique of a television receiver. In the disclosed technique, a scene change may take place in image data displayed on a TV receiver functioning as a master receiver when a TV program is being received. Image data of a frame immediately subsequent to the scene change is displayed on a slave TV receiver. When another scene change takes place in the image data received on the master TV receiver, image data of a frame immediately subsequent to the second scene change is displayed instead of the image data being displayed heretofore.

A variety of techniques relating to display images on the scalable TV receiver have been proposed.

SUMMARY OF THE INVENTION

Japanese Unexamined Patent Application Publication No. 2004-289866 discloses a scalable TV receiver. In accordance with the disclosure, loudspeakers arranged on both sides of display screens of TV receivers emit sounds of TV programs displayed on any TV receiver. Although the plurality of loudspeakers are used in the disclosed scalable TV receiver technique, there is no mention of the audio outputting using the plurality of loudspeaker. Japanese Unexamined Patent Application Publication No. 2005-64746 discloses the virtual sound image formation technique, but there is no or little disclosure about the audio outputting using a plurality of loudspeakers.

There is a need for a technique of outputting audio sounds from a plurality of loudspeakers in a scalable TV receiver.

It is thus desirable to process an audio signal of a sound responsive to an image displayed on a multi-display apparatus.

In accordance with one embodiment of the present invention, an output control system includes a plurality of output control apparatuses, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus. Each of the output control apparatuses includes a communication unit for exchanging information relating to one of a state and a process result of own apparatus with another output control apparatus, and a signal processing unit for processing an audio signal to be output to the corresponding loudspeaker based on the information relating to the other output control apparatus received via the communication unit.

The output control system may further include a plurality of display control apparatuses for controlling respectively image displaying on the plurality of displays forming the multi-display apparatus. The communication unit receives information relating to one of a state and a process result of the plurality of displays from the plurality of display control apparatuses. The signal processing unit processes the audio signal to be output to the corresponding loudspeaker based on the information relating to the plurality of displays received via the communication unit.

Each of the output control apparatuses may include a first signal input unit for inputting the audio signal to be output to the loudspeaker, a second signal input unit for inputting an audio signal except the audio signal to be output to the loudspeaker, and a detecting unit for detecting a feature of the audio signal input by the second signal input unit, wherein the signal processing unit processes the audio signal input by the second signal input unit based on the detection result of the feature of the audio signal detected by the detecting unit and outputs the processed audio signal to the corresponding loudspeaker.

The output control system may further include a plurality of display control apparatuses for controlling respectively image displaying on the plurality of displays forming the multi-display apparatus, wherein the communication unit transmits the detection result of the feature of the audio signal detected by the detecting unit to the plurality of display control apparatuses.

The signal processing unit may process the audio signal to be output to the corresponding loudspeaker so that a sound image of a sound corresponding to an image to be displayed on the multi-display apparatus is localized at any position on a display screen of the multi-display apparatus.

The signal processing unit may process the audio signal to be output to the corresponding loudspeaker so that a sound image of a sound corresponding to an image to be displayed on one of the plurality of displays forming the multi-display apparatus is localized on the center position of and/or along a circle centered on the center position of the display screen of the multi-display apparatus.

The signal processing unit may process the audio signal to be output to the corresponding loudspeaker so that a sound image of a sound corresponding to an image to be displayed on at least two of the plurality of displays forming the multi-display apparatus is localized on a localization position responsive to a size of an image to be displayed on the at least two displays.

Each of the loudspeakers may be assigned a function of providing a different effect to a sound image of a sound responsive to an image to be displayed on the multi-display apparatus, and the signal processing unit may process the audio signal to be output to the corresponding loudspeaker in accordance with the function set to the corresponding loudspeaker.

The corresponding loudspeaker may be assigned a function of providing an effect of sharp-focusing the sound image.

The corresponding loudspeaker may be assigned a function of providing an effect of soft-focusing the sound image.

The corresponding loudspeaker may be assigned a function of providing a reverberation effect.

One embodiment of the present invention relates to an output control method of an output control system including a plurality of output control apparatuses, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus. The method includes steps of exchanging information relating to one of a state and a process result of own apparatus with another output control apparatus, and processing an audio signal to be output to the corresponding loudspeaker based on the received information relating to the other output control apparatus.

One embodiment of the present invention relates to an output control apparatus of a plurality of output control apparatuses forming an output control system, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus. The output control apparatus includes a communication unit for exchanging information relating to one of a state and a process result of own apparatus with another output control apparatus, and a signal processing unit for processing an audio signal to be output to the corresponding loudspeaker based on the information relating to the other output control apparatus received via the communication unit.

One embodiment of the present invention relates to an output control method of an output control apparatus of a plurality of output control apparatuses forming an output control system, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus. The method includes steps of exchanging information relating to one of a state and a process result of own apparatus with another output control apparatus, and processing an audio signal to be output to the corresponding loudspeaker based on the received information relating to the other output control apparatus.

One embodiment of the present invention relates to a program for causing an output control apparatus of a plurality of output control apparatuses forming an output control system to control outputting to a corresponding speaker, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus. The program includes steps of exchanging information relating to one of a state and a process result of own apparatus with another output control apparatus, and processing an audio signal to be output to the corresponding loudspeaker based on the received information relating to the other output control apparatus.

In accordance with embodiments of the present invention, the audio signals respectively corresponding to images displayed on the array of the plurality of displays forming the multi-display apparatus are output to the respective two-dimensionally arranged loudspeakers, including at least two loudspeakers in a vertical direction, and at least two loudspeakers in a horizontal direction. The information relating to one of the state and the process result is exchanged between the apparatuses. The audio signal to be output to the corresponding loudspeaker is processed based on the received information relating to the other output control apparatus.

In accordance with embodiments of the present invention, the output control apparatuses exchange the information relating to one of the state and the process result with each other. The audio signal to be output to the corresponding loudspeaker is processed based on the received information relating to the other output control apparatus.

The audio signal corresponding to the image is processed in response to the image displayed on the multi-display apparatus.

The number of outputs provided in a scalable fashion is modified. The outputs are individually processed.

BRIEF DESCRIPTION OF THE DRAWINGS

FIG. 5 illustrates parameters assigned to each loudspeaker of FIG. 4;

FIG. 16 is a flowchart illustrating an audio signal process performed in step S16 of FIG. 15;

FIG. 17 is a block diagram illustrating an audio signal processor of FIG. 3 performing the process of FIG. 16;

FIG. 18 is a flowchart illustrating another example of the audio signal process performed in step S16 of FIG. 15;

FIG. 19 is a block diagram illustrating the audio signal processor of FIG. 3 performing the process of FIG. 18; and FIG. 20 is a block diagram illustrating a personal computer in accordance with one embodiment of the present invention.

DESCRIPTION OF THE PREFERRED
EMBODIMENTS

Before describing an embodiment of the present invention, the correspondence between the features of the present invention and an embodiment disclosed in the specification or the drawings of the invention is discussed below. This statement is intended to assure that embodiments supporting the claimed invention are described in this specification or the drawings. Thus, even if an embodiment is described in the specification or the drawings, but not described as relating to a feature of the invention herein, that does not necessarily mean that the embodiment does not relate to that feature of the invention. Conversely, even if an embodiment is described herein as relating to a certain feature of the invention, that does not necessarily mean that the embodiment does not relate to other features of the invention.

Figure 1:
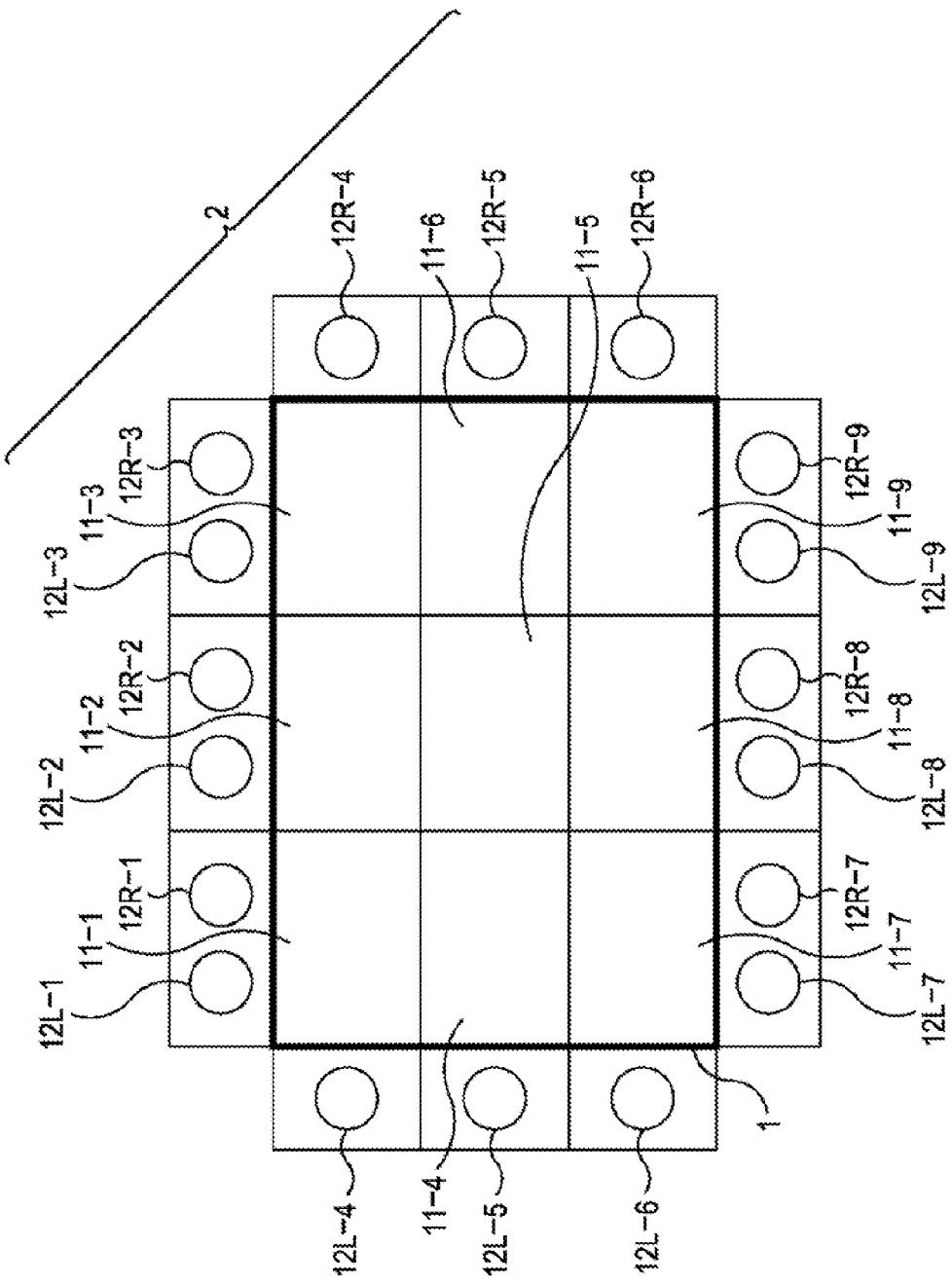
FIG. 1 is a block diagram illustrating a multi-speaker system in accordance with one embodiment of the present invention.

In accordance with one embodiment of the present invention, an output control system (for example, multi-speaker system of FIG. 1) includes a plurality of output control apparatuses (for example, speaker engines 33-1 through 33-9 of FIG. 2), the output control apparatuses controlling audio signals supplied to respective two-dimensionally arranged loudspeakers (for example, multi-speaker 2 of FIG. 1), including at least two loudspeakers in a vertical direction, and at least two loudspeakers in a horizontal direction (for example, loudspeakers 12L-1, 12R-1 and 12B-1 of FIG. 2), the audio signals respectively corresponding to images displayed on an array of a plurality of displays (for example, displays 11-1 through 11-9 of FIG. 1) forming a multi-display apparatus (for example, multi-display apparatus 1 of FIG. 1). Each of the output control apparatuses includes a communication unit (for example, controller 54 of FIG. 3) for exchanging information relating to one of a state and a process result of own apparatus with another output control apparatus, and a signal processing unit (for example, audio signal processor 53 of FIG. 3) for processing an audio signal to be output to the corresponding loudspeaker based on the information relating to the other output control apparatus received via the communication unit.

The output control system may further include a plurality of display control apparatuses (for example, video engines 34-1 through 34-9 of FIG. 2) for controlling respectively image displaying on the plurality of displays forming the multi-display apparatus, wherein the communication unit receives information relating to one of a state and a process result of the plurality of displays from the plurality of display control apparatuses, and wherein the signal processing unit processes the audio signal to be output to the corresponding loudspeaker based on the information relating to the plurality of displays received via the communication unit.

Each of the output control apparatuses includes a first signal input unit (for example, audio input unit 51-1 of FIG. 3) for inputting the audio signal to be output to the loudspeaker, a second signal input unit (for example, audio input unit 51-2 of FIG. 3) for inputting an audio signal except the audio signal to be output to the loudspeaker, and a detecting unit (for example, monitoring processor 53a of FIG. 3) for detecting a feature of the audio signal input by the second signal input unit, wherein the signal processing unit processes the audio signal input by the second signal input unit based on the detection result of the feature of the audio signal detected by the detecting unit and outputs the processed audio signal to the corresponding loudspeaker.

The output control system may further include a plurality of display control apparatuses (for example, video engines 34-1 through 34-9 of FIG. 2) for controlling respectively image displaying on the plurality of displays forming the multi-display apparatus, wherein the communication unit transmits the detection result of the feature of the audio signal detected by the detecting unit to the plurality of display control apparatuses.

Figure 4:
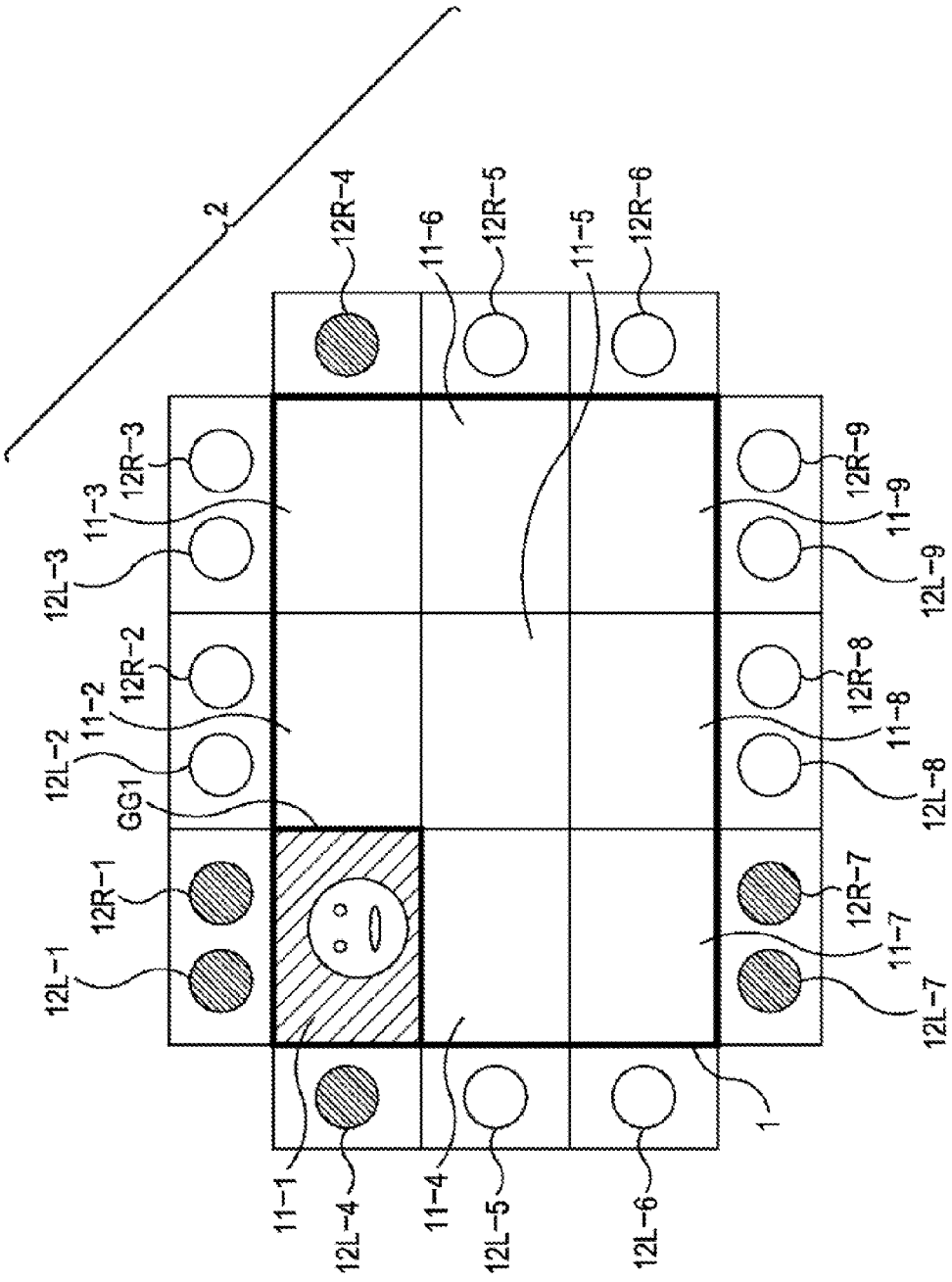
FIG. 4 illustrates an active screen on a multi-display apparatus of FIG. 1.

The signal processing unit may process the audio signal to be output to the corresponding loudspeaker so that a sound image of a sound corresponding to an image (for example, image G1 of FIG. 9) to be displayed on one of the plurality of displays forming the multi-display apparatus is localized on the center position of and/or along circle (for example, circle M1 of FIG. 9) centered on the center position of the display screen of the multi-display apparatus (for example, display 11-1 of FIG. 4).

Figure 7:
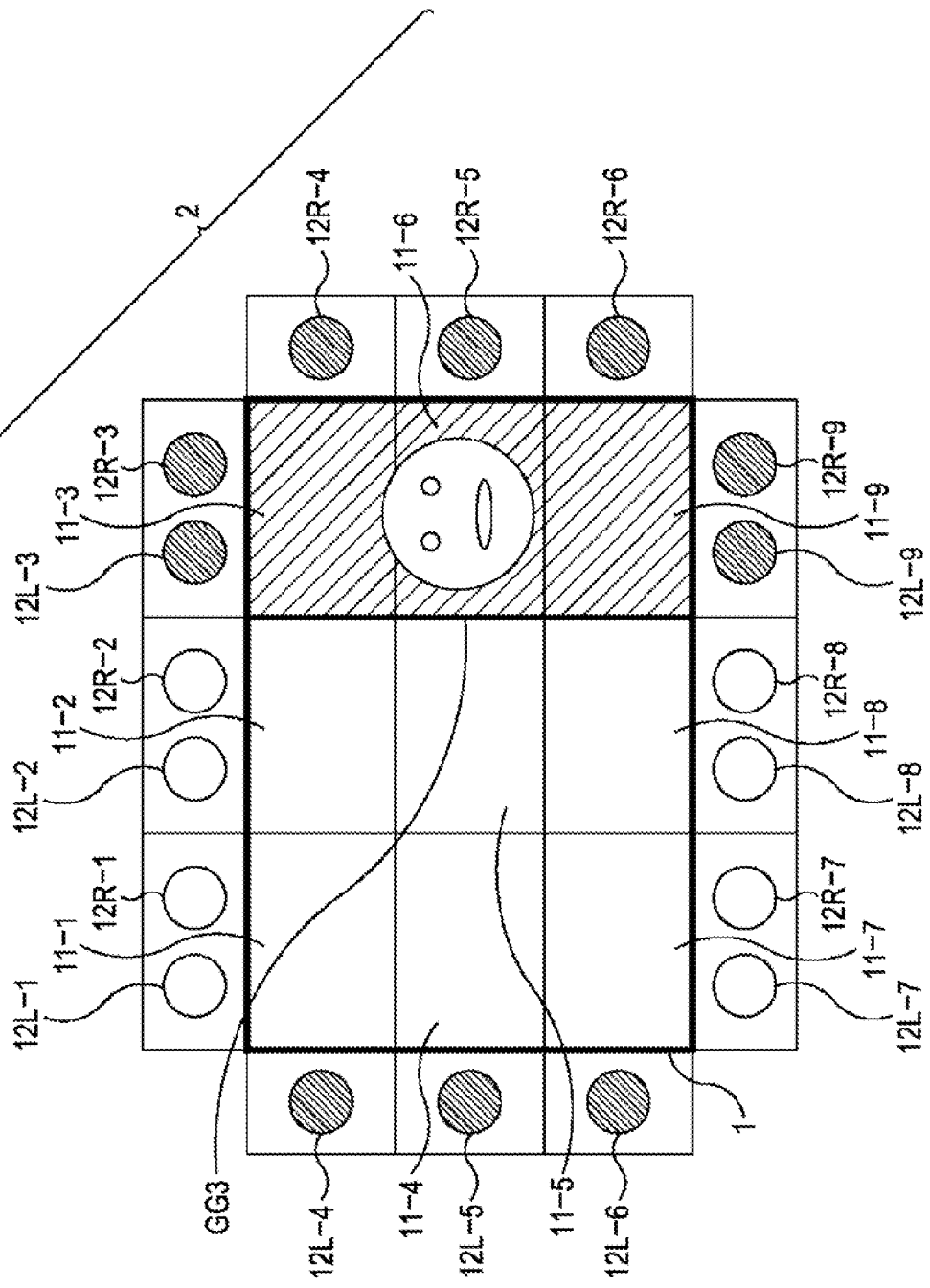
FIG. 7 illustrates yet another example of the active screen of the multi-display apparatus of FIG. 1.

The signal processing unit may process the audio signal to be output to the corresponding loudspeaker so that a sound image of a sound corresponding to an image (for example, image GC1 of FIG. 12) to be displayed on at least two of the plurality of displays forming the multi-display apparatus is localized on a localization position responsive to a size of an image to be displayed on the at least two displays (for example, displays 11-1 through 11-9 of FIG. 7).

One embodiment of the present invention relates to an output control method of an output control apparatus of a plurality of output control apparatuses forming an output control system, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus. The method includes steps of exchanging information relating to one of a state and a process result of own apparatus with another output control apparatus (for example, in step S11 of FIG. 15), and processing an audio signal to be output to the corresponding loudspeaker based on the received information relating to the other output control apparatus (for example, in step S16 of FIG. 15).

One embodiment of the present invention relates to an output control apparatus of a plurality of output control apparatuses forming an output control system (for example, multi-speaker system of FIG. 1) including a plurality of output control apparatuses (for example, speaker engines 33-1 through 33-9 of FIG. 2), the output control apparatuses controlling audio signals supplied to respective two-dimensionally arranged loudspeakers (for example, multi-speaker 2 of FIG. 1), including at least two loudspeakers in a vertical direction, and at least two loudspeakers in a horizontal direction (for example, loudspeakers 12L-1, 12R-1 and 12B-1 of FIG. 2), the audio signals respectively corresponding to images displayed on an array of a plurality of displays (for example, displays 11-1 through 11-9 of FIG. 1) forming a multi-display apparatus (for example, multi-display apparatus 1 of FIG. 1). The output control apparatus includes a communication unit (for example, controller 54 of FIG. 3) for exchanging information relating to one of a state and a process result of own apparatus with another output control apparatus, and a signal processing unit (for example, audio signal processor 53 of FIG. 3) for processing an audio signal to be output to the corresponding loudspeaker based on the information relating to the other output control apparatus received via the communication unit.

One embodiment of the present invention relates to a program for causing an output control apparatus of a plurality of output control apparatuses forming an output control system to control outputting to a corresponding speaker, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus. The program includes steps of exchanging information relating to one of a state and a process result of own apparatus with another output control apparatus (for example, in step S11 of FIG. 14), and processing an audio signal to be output to the corresponding loudspeaker based on the received information relating to the other output control apparatus (for example, in step S16 of FIG. 15).

The embodiments of the present invention are described below with reference to the drawings.

FIG. 1 illustrates a multi-speaker system in accordance with one embodiment of the present invention. The system herein refers to a logical set of a plurality apparatuses and whether elements of the apparatuses are contained in the same housing or not is not important.

As shown in FIG. 1, the multi-speaker system includes a multi-display apparatus 1 composed of nine displays 11-1 through 11-9, and a multi-speaker 2 composed of nine pairs of loudspeakers 12L-1 through 12L-9 and loudspeakers 12R-1 through 12R-9 (L stands for left and R stands for right). The multi-speaker system controls outputting of an audio signal responsive to an image displayed on the multi-display apparatus 1. For convenience of explanation, loudspeakers arranged on the left side of a listener are referred to as left loudspeakers, and loudspeakers arranged on the right side of the listener are referred to as right loudspeakers.

The multi-display apparatus 1 displays different images of different programs respectively on the displays 11-1 through 11-9 arranged in an array of three rows by three columns, or displays expanded images on at least two displays of the nine displays 11-1 through 11-9.

The housing of the displays 11-1 through 11-9 is designed to house an array of three rows by three columns. More specifically, displays 11-1 through 11-3 are arranged on the top row from left to right, displays 11-4 through 11-6 are arranged on the middle row from left to right, and displays 11-7 through 11-8 are arranged on the bottom row from left to right. If there is no need for discriminating one display from another, each of the displays 11-1 through 11-9 is simply referred to as a display 11. Any number of displays 11 may be used. The number of rows and the number of columns are not limited to any particular number.

In the multi-speaker system, the number of image or screen the user can operate from among at least one image displayed on the displays 11 is one (such an image is referred to as an active screen). Using a remote controller (not shown), the user selects an active screen from among the plurality of screens and issues an instruction to set a volume level, to select a broadcasting station, or to zoom the image on the active screen. The active screen is thus related to an audio output from the multi-speaker 2.

The multi-speaker 2 controls the audio output signals to the nine pairs of loudspeakers 12L-1 through 12L-9 and loudspeakers 12R-1 through 12R-9 so that the sound corresponding to the active screen is emitted from the vicinity of the active screen on the display of the multi-display apparatus 1, i.e., so that a sound image of the sound is localized on the active screen. In other words, the multi-speaker 2 causes the sound corresponding to the active screen to be emitted from one of the nine pairs of loudspeakers 12L-1 through 12L-9 and loudspeakers 12R-1 through 12R-9 matching the position and size of the active screen.

If it is not necessary to discriminate one from among the left loudspeakers 12L-1 through 12L-9 and one from among the right loudspeakers 12R-1 through 12R-9, the left speaker is simply referred to as a left loudspeaker 12L and the right speaker is simply referred to as a right loudspeaker 12R. Furthermore, each of these loudspeakers may be representatively referred to as a loudspeaker 12. No particular number is set to the number of pairs of the loudspeakers 12. The number of pairs does not necessarily coincide with the number of displays 11.

The nine pairs of loudspeakers 12L-1 through 12L-9 and loudspeakers 12R-1 through 12R-9 surround the displays 11-1 through 11-9 arranged in an array of three rows by three columns. The surfaces of the displays 11-1 through 11-9 are flush with the surfaces of the housings of the loudspeakers 12. More specifically, six loudspeakers are arranged above and below the displays 11-1 through 11-9, and three loudspeakers are arranged to the left and right of the displays 11-1 through 11-9 in a two-dimensional fashion.

The loudspeakers 12L-1 and 12R-1 are arranged on the leftmost portion of the top row of loudspeakers above the display 11-1, the loudspeakers 12L-2 and 12R-2 are arranged on the middle portion of the top row of loudspeakers above the display 11-2, and the loudspeakers 12L-3 and 12R-3 are arranged on the leftmost portion of the top row of loudspeakers above the display 11-3. The loudspeakers 12L-4 and 12R-4 are arranged on left and right positions, sandwiching the top row of displays 11-1 through 11-3. The loudspeakers 12L-5 and 12R-5 are arranged on left and right positions, sandwiching the intermediate row of displays 11-4 through 11-6. The loudspeakers 12L-6 and 12R-6 are arranged on left and right positions, sandwiching the bottom row of displays 11-7 through 11-9.

The loudspeakers 12L-7 and 12R-7 are arranged on the leftmost portion of the bottom row of loudspeakers below the display 11-7, the loudspeakers 12L-8 and 12R-8 are arranged on the intermediate portion of the bottom row of loudspeakers below the display 11-8, and the loudspeakers 12L-9 and 12R-9 are arranged on the rightmost portion of the bottom row of loudspeakers below the display 11-9. The layout of the loudspeakers 12 is not limited to the one illustrated in FIG. 1. It is sufficient if at least two loudspeakers 12 in a vertical direction and at least two loudspeakers 12 in a horizontal direction are arranged two dimensionally.

Each loudspeaker 12 outputs a sound responsive to an active screen, the sound being signal processed in accordance with the position and screen size of the active screen and the speaker position of own loudspeaker.

In the multi-speaker system, the loudspeakers 12 surrounding the multi-display apparatus 1 from above, below and sideway output a sound that has been processed in accordance with the position and size of the active screen on the display of the multi-display apparatus 1 (namely, on a surface on which the multi-speaker 2 is two-dimensionally arranged) and the position of own loudspeaker. Since the sound image of the sound of the active screen is localized on the active screen at any position, the user can intuitively recognize the position of the active screen.

Figure 2:
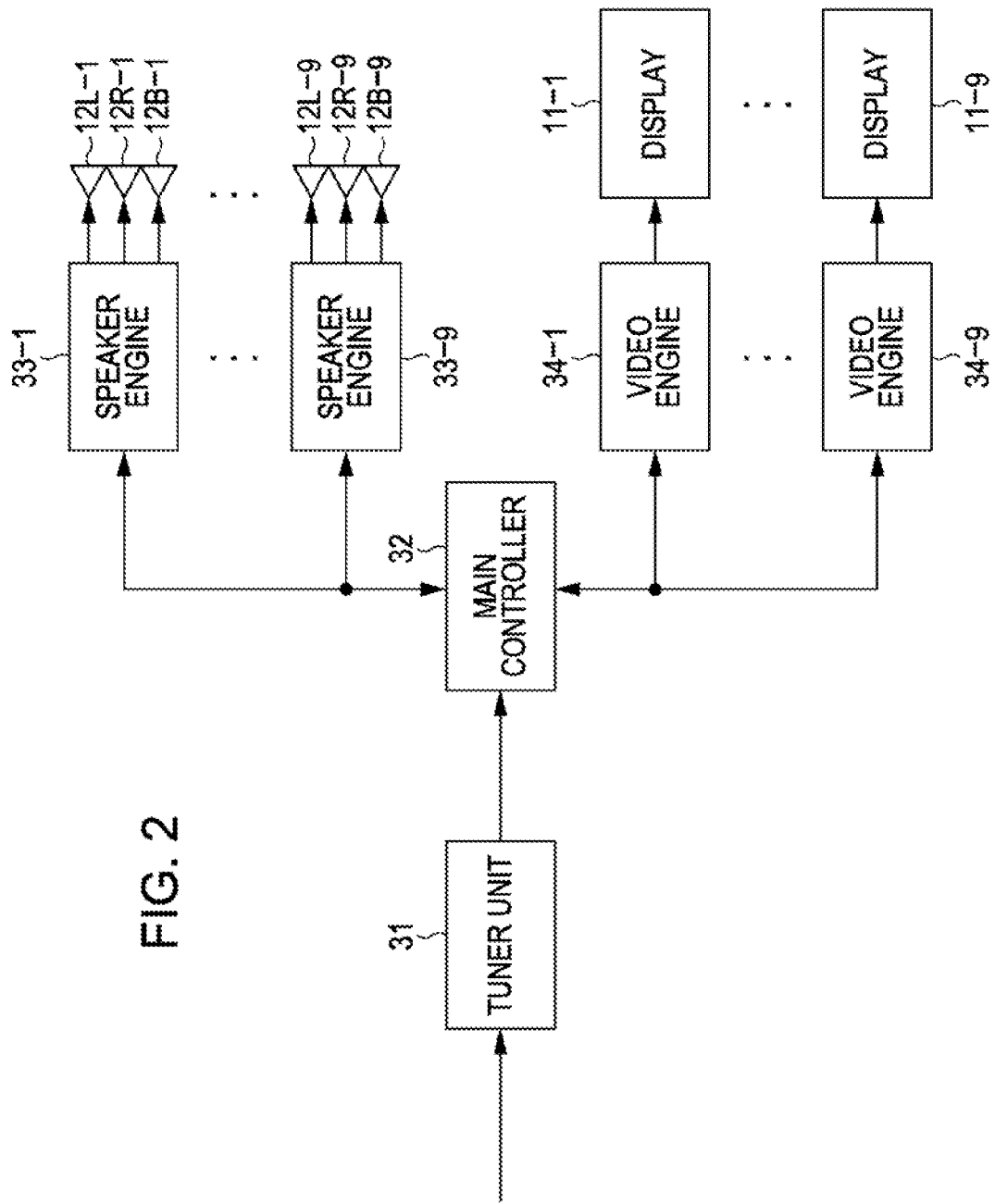
FIG. 2 is a block diagram illustrating an electrical structure of the multi-speaker system of FIG. 1.

FIG. 2 illustrates an electrical structure of the multi-speaker system of FIG. 1. As shown in FIG. 2, the left loudspeakers 12L-1 through 12L-9, the right loudspeakers 12R-1 through 12R-9, and woofer loudspeakers 12B-1 through 12B-9 are respectively combined in a set. If it is not necessary to discriminate one from another among the woofer loudspeakers 12B-1 through 12B-9, each of these is referred to as a loudspeaker 12B. The loudspeaker 12L, the loudspeaker 12R and the woofer loudspeaker 12B are collectively referred to as a loudspeaker 12.

As shown in FIG. 2, the multi-speaker system includes a tuner unit 31, a main controller 32, speaker engines 33-1 through 33-9 for processing the audio signals to be respectively output to nine sets of the loudspeakers 12L-1 through 12L-9, the loudspeakers 12R-1 through 12R-9 and the loudspeakers 12B-1 through 12B-9, and video engines 34-1 through 34-9 for processing an image to be output to the corresponding display 11.

If it is not necessary to discriminate one from another among the speaker engines 33-1 through 33-9 and one from another among the video engines 34-1 through 34-9, each speaker engine is simply referred to as a speaker engine 33 and each video engine is simply referred to as a video engine 34.

The tuner unit 31 includes a plurality of tuners. Each tuner in the tuner unit 31 selects a reception band of a broadcast signal transmitted from a broadcasting station and received by an antenna (not shown), demodulates the broadcast signal in the selected reception band using a predetermined method and then outputs a video signal and an audio signal of the demodulated signal to the main controller 32.

The main controller 32, including a micro processor unit (MPU) and the like, controls the plurality of speaker engines 33 and video engines 34 connected to the multi-speaker system in a coordinated fashion. More specifically, the main controller 32 receives an instruction signal from the user from a remote controller (not shown), information such as a state and a process result from the video engine 34 and a state and a process result from the speaker engine 33.

The main controller 32 supplies the instruction signal from the user to the speaker engine 33 and the video engine 34 as necessary. The main controller 32 further supplies information from the video engine 34 to the other video engines 34 and the speaker engines 33, and supplies information from the speaker engine 33 to the other speaker engines 33 and the video engines 34. The information such as the state and process result of the video engines 34 and the information such as the state and the process result of the speaker engines 33 are exchanged with each other via the main controller 32.

In response to the instruction signal from the user from the remote controller, the main controller 32 outputs the video signal from the tuner unit 31 to the video engine 34 and outputs the audio signal from the tuner unit 31 to the speaker engine 33.

To output images of different programs to the displays 11, the video signals of the different programs are output to the video engines 34. For example, to output the video of the same program to the displays 11-1 through 11-3, the video engines 34-1 through 34-3 corresponding to the displays 11-1 through 11-3 are supplied with the video signal of the same program, and the remaining video engines are supplied with video signals of the different programs.

The main controller 32 outputs to the speaker engines 33 the audio signal of the active screen set by the user and an audio signal of at least one more audio signal.

The speaker engine 33 and the video engine 34 are detachably mounted on the multi-speaker system. The mounted (connected) speaker engine 33 and video engine 34 exchange information with each other via the main controller 32.

In accordance with the states of the video engines 34 and the states of the other speaker engines 33, the speaker engine 33 recognizes the configuration of the multi-display apparatus 1 and the multi-speaker 2, namely, the number and arrangement of displays 11 forming the multi-display apparatus 1 and the number and arrangement of loudspeakers 12 forming the multi-speaker 2. The speaker engine 33 thus acquires identification (ID) numbers of the corresponding loudspeakers 12L, 12R and 12B in the multi-speaker 2. The ID number may be acquired by pre-setting and confirming a dual in-line package (DIP) switch.

In accordance with the ID number of the corresponding loudspeaker 12 and the process result from the video engine 34 (such as an active screen signal and a screen size signal), the speaker engine 33 selects parameters relating to the audio signal process of the corresponding loudspeakers 12L, 12R and 12B and processes the audio signal input from the main controller 32 in accordance with the selected parameter.

The speaker engine 33 receives the audio signal responsive to the active screen as an audio signal to be output to the loudspeakers 12 (also referred to as a speaker output signal) and at least one more audio signal as a sub channel signal.

The speaker engine 33 processes the audio signal as the speaker output signal and then outputs the processed audio signal to the corresponding loudspeaker 12. The speaker engine 33 also monitors the sub channel audio signal and processes the audio signal of the sub channel instead of the speaker output signal in response to the monitoring result. The process result of the speaker engine 33 is also supplied to the other speaker engines 33 and the video engines 34 via the main controller 32.

In accordance with the states of the other video engines 34 and, if necessary, the states of the speaker engines 33, the video engine 34 recognizes the configuration of the multi-display apparatus 1 and the multi-speaker 2, thereby recognizing the ID number of the corresponding display 11 in the multi-display apparatus 1. In response to the instruction signal from the user from the main controller 32, the video engine 34 sets own image (screen) as the active screen and releases the active screen setting.

In response to the instruction signal from the user from the main controller 32, the video engine 34 processes the image signal input from the main controller 32 in cooperation with the other video engines 34, thereby displaying an expanded image or displaying an image of an individual program. The video engine 34 then outputs the processed image signal to the display 11. The process result of the video engine 34 (for example, active screen signal, screen size signal, channel number, zoom size, etc.) is transmitted to the speaker engines 33 and the other video engines 34 via the main controller 32.

Since the speaker engines 33 and the video engines 34 exchange information with each other via the main controller 32 in the multi-speaker system as described above, any number of speaker engines 33 and video engines 34 may be added to modify the number of outputs.

Since the speaker engines 33 and the video engines 34 individually perform the process thereof in the multi-speaker system, an audio signal process and an image signal process may be individually performed on the outputs.

As shown in FIG. 2, the speaker engines 33 and the video engines 34 exchange information via the main controller 32. Alternatively, the speaker engines 33 and the video engines 34 may be connected to each other in a wired fashion or a wireless fashion and may exchange information with each other without the main controller 32.

Figure 3:
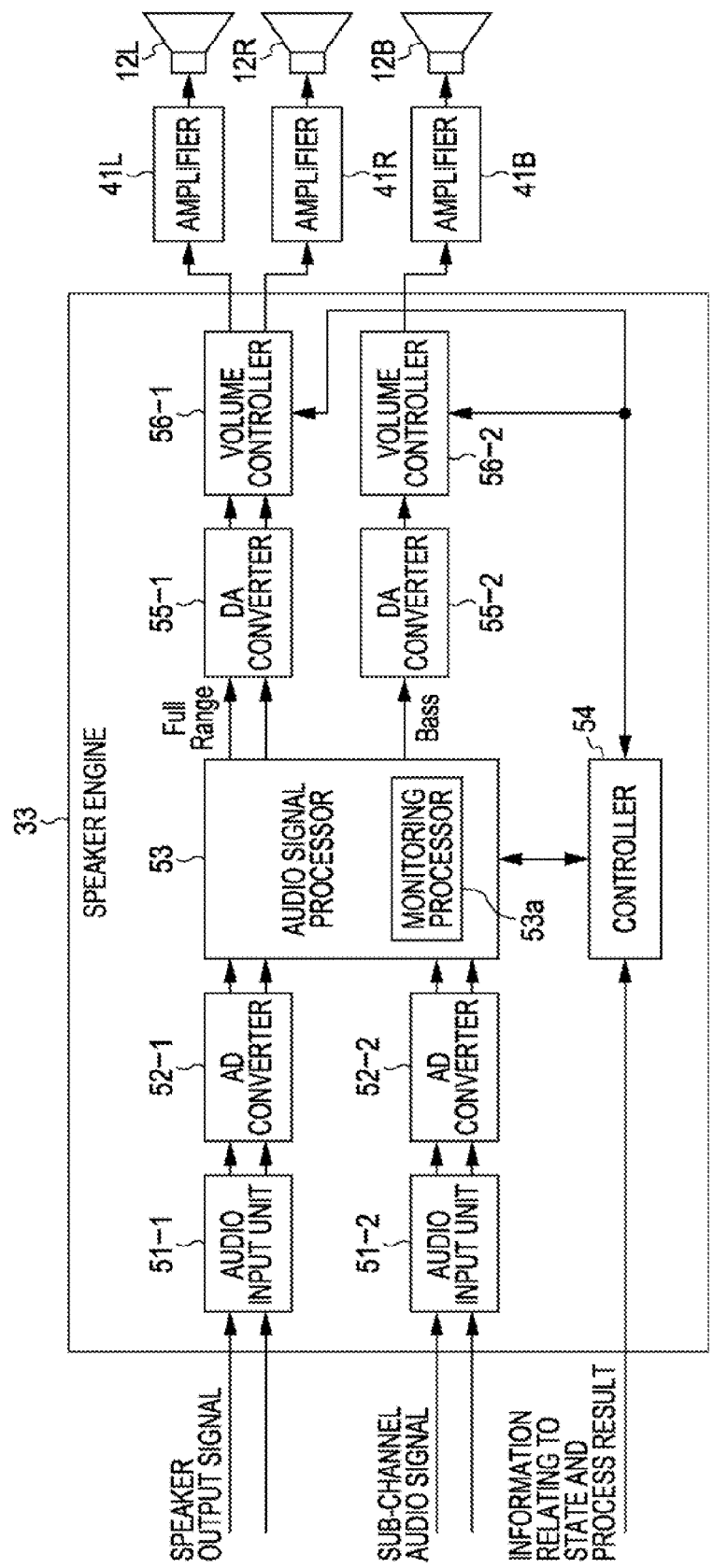
FIG. 3 is a block diagram illustrating a speaker engine of FIG. 2.

FIG. 3 illustrates the structure of the speaker engine of 33 FIG. 2. As shown in FIG. 3, amplifiers 41L, 41R and 41B are respectively arranged between the speaker engine 33 and the loudspeakers 12L, 12R and 12B to amplify the audio signals from the speaker engine 33.

The speaker engine 33 of FIG. 3 includes audio input units 51-1 and 51-2, analog-to-digital (AD) converters 52-1 and 52-2, an audio signal processor 53, a monitoring processor 53a, digital-to-analog (DA) converters 55-1 and 55-2 and volume controllers 56-1 and 56-2.

The audio input unit 51-1 receives audio signals (a left audio signal and a right audio signal) corresponding to the active screen from the main controller 32 as speaker output signals (a left speaker output signal and a right speaker output signal) and then outputs the audio signals to the AD converter 52-1. The AD converter 52-1 AD converts the left speaker output signal and the right speaker output signal and outputs the digital left speaker output signal and right speaker output signal to the audio signal processor 53.

The audio input unit 51-2 receives audio signals of at least one channel (a left audio signal and a right audio signal) other than the audio signals for the active screen from the main controller 32 as sub channel audio signals (a sub channel left audio signal and a sub channel right audio signal) and outputs the audio signals to the AD converter 52-2. The AD converter 52-2 AD converts the sub channel left audio signal and the sub channel right audio signal from the audio input unit 51-2 and outputs the digital sub channel left audio signal and sub channel right audio signal to the audio signal processor 53.

The audio signal processor 53 stores parameters responsive to the loudspeakers 12 in a variety of configurations of the multi-display apparatus 1 and the multi-speaker 2. Such a parameter group includes parameters predetermined for the position and size of the active screen on the multi-display apparatus 1 based on sound image localization and sound expression to be discussed later.

The audio signal processor 53 selects a parameter group based on the states of the video engines 34 and the sates of the other speaker engines 33 supplied from the controller 54 and selects a parameter from the selected parameter group based on the process results of the video engines 34 and the speaker engines 33 (for example, the position and size of the active screen in the multi-display apparatus 1) supplied from the controller 54. The audio signal processor 53 processes the speaker output signal from the AD converter 52-1 in accordance with the selected parameter. The full range left audio signal and right audio signal thus processed are output to the DA converter 55-1 while the bass audio signals thus processed are output to the DA converter 55-2.

The audio signal processor 53 includes a monitoring processor 53a monitoring the sub-channel audio signal. The monitoring processor 53a analyzes the sub-channel audio signal input from the AD converter 52-2 and then supplies information extracted as a result of analyzing the sub-channel audio signal to the audio signal processor 53. The audio signal processor 53 performs a process in accordance with the information extracted by the monitoring processor 53a and supplies the process results to the other speaker engines 33 and the video engines 34 via the controller 54 and the main controller 32.

The monitoring processor 53a monitors features of an emergency broadcast program and a quick report in the sub-channel audio signal (i.e., an audio signal characteristic of the emergency broadcast program and the quick report). If the audio signal characteristic of one of the emergency broadcast program and the quick report is contained in the sub-channel audio signal, the monitoring processor 53a extracts the audio signal of the emergency broadcast program or the quick report and supplies the extraction results to the audio signal processor 53. The audio signal processor 53 in turn supplies the extraction result to the other speaker engines 33 and the video engines 34 via the controller 54 and the main controller 32 while performing the audio signal process with the audio signal output to the loudspeaker 12 switched to the sub-channel audio signal.

The controller 54 transmits the states of the speaker engines 33 (for example, configuration of the multi-speaker 2 connected to the main controller 32) and the process result of the audio signal processor 53 to the main controller 32, thereby supplying these pieces of information to the other speaker engines 33 and the video engines 34. The controller 54 receives the instruction signal from the user and the states and the process results of the other speaker engines 33 and the video engines 34 and, based on the received information, controls the audio signal processor 53 or the volume controllers 56-1 and 56-2.

The DA converter 55-1 digital-to-analog converts the audio processed, full range left audio signal and right audio signal from the audio signal processor 53 and outputs resulting analog left audio signal and right audio signal to the volume controller 56-1. The DA converter 55-2 digital-to-analog converts the audio processed, bass audio signal and outputs the resulting analog bass audio signal to the volume controller 56-2.

The volume controller 56-1 under the control of the controller 54 controls the volume level of the analog left audio signal and the analog right audio signal from the DA converter 55-1, thereby outputting the volume controlled analog left audio signal and analog right audio signal to the loudspeakers 12L and 12R via the amplifiers 41L and 41R. A left sound responsive to the signal processed left audio signal and a right sound responsive to the signal processed right audio signal are emitted from the loudspeakers 12L and 12R, respectively.

The volume controller 56-2 under the control of the controller 54 controls the volume level of the analog bass audio signal from the DA converter 55-2 and outputs the volume controlled bass audio signal to the loudspeaker 12B via the amplifier 41B. A bass sound responsive to the signal processed bass audio signal is thus output from the loudspeaker 12B.

As shown in FIG. 3, a single channel audio signal is input as the sub-channel audio signal. Alternatively, audio signals of a plurality of channels may be input in the same way as the single channel.

FIG. 4 illustrates the active screen in the multi-display apparatus of FIG. 1.

As shown in FIG. 4, the displays 11-1 through 11-9 arranged in an array of three rows by three columns show images of different programs. More specifically, the multi-display apparatus 1 of FIG. 4 includes nine screens. From among the nine screens, a screen GG1 of the display 11-1 on the top left (indicating an image of a face displayed on the display 11-1) is set as an active screen.

The multi-speaker 2 causes only the loudspeakers 12L-1 and 12R-1 immediately above the display 11-1, the loudspeakers 12L-7 and 12R-7 right below the display 11-1, and the loudspeakers 12L-4 and 12R-4 on both sides of the display 11-1 to emit the sound corresponding to the screen GG1 of the display 11-1. The sound image of the sound is thus localized on the screen GG1 of the display 11-1 as the active screen. Hatched loudspeakers 12 have a higher degree of importance in use than the other loudspeakers. As shown in FIG. 4, sound is emitted from only the loudspeakers 12 having a higher degree of importance in use.

The multi-speaker 2 delays the audio signal output to the loudspeakers 12L-4 and 12R-4 arranged on both sides of the display 11-1, and adjusts the volume level of the audio signal output to the loudspeakers 12L-1 and 12R-1 and the loudspeakers 12L-7 and 12R-7 arranged above and blow the display 11-1. The sound image is thus localized in the vertical and horizontal directions onto the display 11-1.

According to past researches, human beings have sound discrimination better in a horizontal direction than in a vertical direction due to the geometry of the ears of the humans, and this human hearing difference property becomes pronounced in recognizing the direction of a sound source. The delay operation is not so effective in a vertical direction as in a horizontal direction.

To localize the sound image in the vertically expanding space, the volume control operation of the loudspeakers arranged in a vertical direction is effectively used in the multi-speaker 2. Robust sound localization is thus achieved in the vertical direction. More specifically, each loudspeaker 12 is assigned parameters for delay operation and volume control operation set for the sound image localization on the active screen (screen GG1 of FIG. 4) in a vertical direction and a horizontal direction.

FIG. 5 illustrates parameters assigned to the loudspeakers.

FIG. 5 illustrates volume parameters and delay parameters set for the loudspeakers 12L-4 and 12R-4 arranged on both sides of the display 11-1, the loudspeakers 12L-1 and 12R-1 arranged right above the display 11-1 and the loudspeakers 12L-7 and 12R-7 arranged right below the display 11-1 as shown in FIG. 4. The volume parameters and the delay parameters of the remaining loudspeakers (not listed) are "zeroes."

The loudspeaker 12L-4 is assigned a volume parameter of "0.5" and a delay parameter of "0" and the loudspeaker 12R-4 is assigned a volume parameter of "0.5" and a delay parameter of "50."

Each of the loudspeakers 12L-1 and 12R-1 is assigned a volume parameter of "0.9" and a delay parameter of "0" and each of the loudspeakers 12L-7 and 12R-7 is assigned a volume parameter of "0.4" and a delay parameter of "0."

The maximum value the volume parameter can take is "1" and the delay parameter is a delay sample amount to a sound having a sampling frequency of 48 kHz.

As shown in FIG. 4, the loudspeaker 12R-4 is farther from the screen GG1 of the display 11-1 than the loudspeaker 12L-4 in a horizontal direction, and an audio signal supplied to the loudspeaker 12R-4 is thus delayed by a 50 sample delay. Sound is thus localized on the screen GG1 of the display 11-1.

Let a volume parameter of "0.5" assigned to the left loudspeaker 12L-4 and right loudspeaker 12R-4 be a standard volume parameter in a vertical direction. The loudspeakers 12L-1 and 12R-1 are assigned a volume parameter of "0.9" larger than the standard volume parameter of "0.5" and the loudspeakers 12L-7 and 12R-7 are assigned a volume parameter of "0.4" smaller than the standard volume parameter of "0.5." Sound is thus localized on the screen GG1 of the display 11.

The sound localization of the multi-speaker 2 is performed using the delay operation based on an arrival time difference between the two ears and the volume control operation based on a volume level difference of the sound arriving at the two ears.

Figure 6:
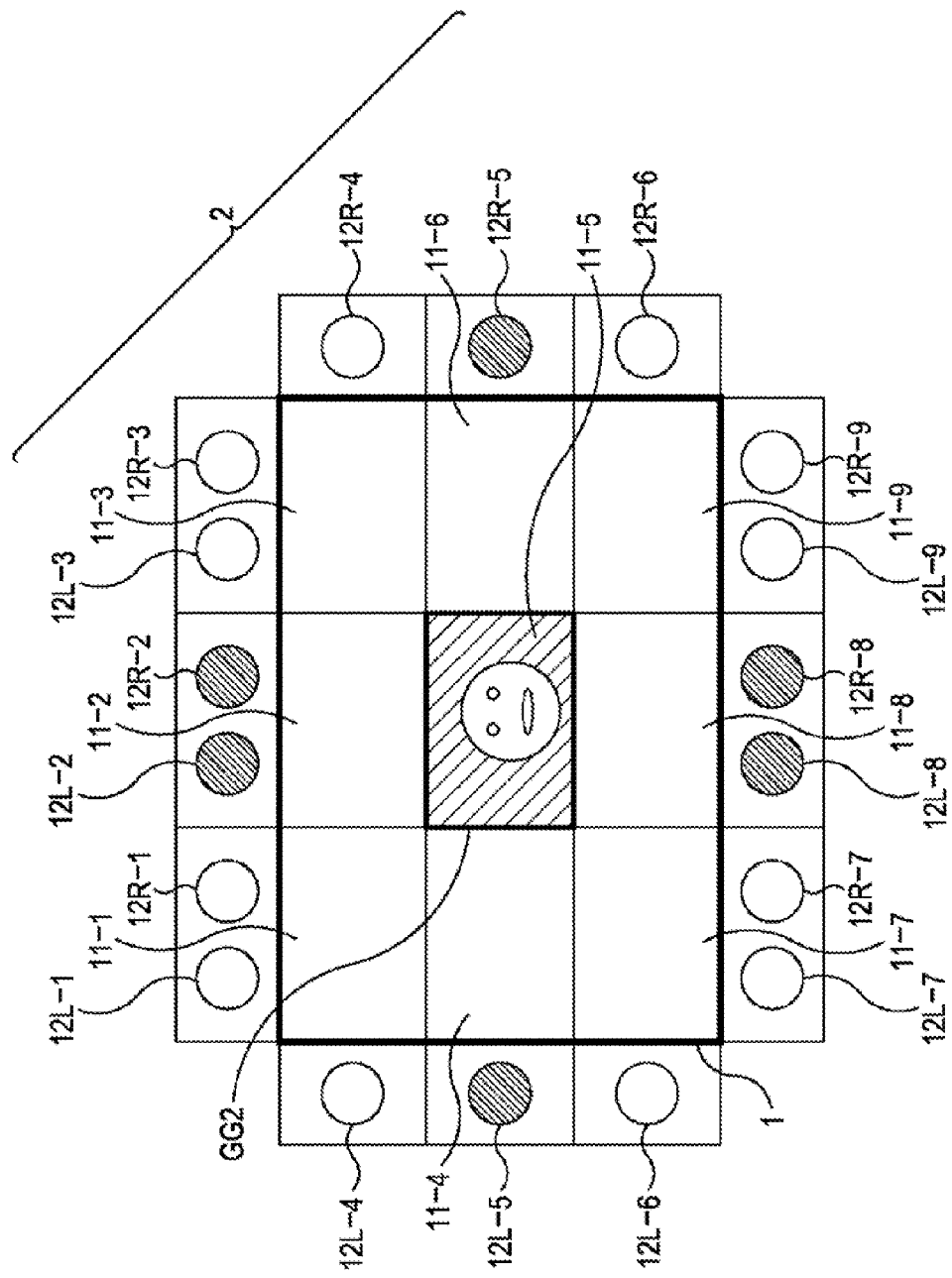
FIG. 6 illustrates another example of the active screen of the multi-display apparatus of FIG. 1.

FIG. 6 illustrates another example of active screen on the multi-display apparatus of FIG. 1.

As shown in FIG. 6, the displays 11-1 through 11-9 arranged in an array of three rows by three columns display different images as shown in FIG. 4. The multi-display apparatus 1 of FIG. 6 also includes nine screens. From among the nine screen, the active screen is a screen GG2 of the second display 11-5 (an image of a face displayed on the display 11-5) from the left on the intermediate row (namely, the center screen of the multi-display apparatus 1).

To localize sound on the screen GG2 of the display 11-5 as the active screen, the multi-speaker 2 causes only the loudspeakers 12L-2 and 12R-2 right above the display 11-5, the loudspeakers 12L-8 and 12R-8 right below the display 11-5 and the loudspeakers 12L-5 and 12R-5 on both sides of the display 11-5 to output the sound corresponding to the screen GG2 of the display 11-5.

The multi-speaker 2 delays the audio signal of the sound to be emitted from the loudspeakers 12L-5 and 12R-5 arranged to both sides of the display 11-5. The multi-speaker 2 controls the volume level of the audio signal of the sound to be emitted from the loudspeakers 12L-2 and 12R-2 above the display 11-5 and the loudspeakers 12L-8 and 12R-8 below the display 11-5. The multi-speaker 2 thus localizes the sound in the vertical and horizontal directions.

As shown in FIG. 6, the loudspeakers 12L-5 and 12R-5 have the same distance to the screen GG2 of the display 11-5 and the loudspeakers 12L-2 and 12R-2 and the loudspeakers 12L-8 and 12R-8 have also the same distance to the screen GG2 of the display 11-5. By performing the delay operation and the volume control operation, the vertical and horizontal sound localization is performed on the display 11-5.

The multi-speaker 2 of FIG. 6 also assigns to the loudspeakers 12 volume parameters and delay parameters, as the ones listed in FIG. 5, set for the vertical and horizontal sound image localization on the active screen (screen GG2 of FIG. 6) (no corresponding parameter list is shown here).

FIG. 7 illustrates another example of active screen on the multi-display apparatus of FIG. 1.

As shown in FIG. 7, from among the displays 11-1 through 11-9 arranged in an array of three rows by three columns, the displays 11-3, 11-6 and 11-9 display expanded images of one program while the remaining displays 11 display images of different programs. From the seven screens of the multi-display apparatus 1 of FIG. 7, the expansion screen GG3 of the displays 11-3, 11-6 and 11-9 (an image of a face displayed on the displays 11-3, 11-6 and 11-9) is set as an active screen.

The one expansion screen displayed on a plurality of displays 11 like the expansion screen GG3 of FIG. 7 is also referred to as a zoom screen.

To localize sound on the screen GG3 of the displays 11-3, 11-6 and 11-9 as the active screen, the multi-speaker 2 causes only the loudspeakers 12L-3 and 12R-3 right above the displays 11-3, 11-6 and 11-9, the loudspeakers 12L-9 and 12R-9 right below the displays 11-3, 11-6 and 11-9 and the loudspeakers 12L-4 through 12L-6 and the loudspeakers 12R-4 through 12R-6 to both sides of the displays 11-3, 11-6 and 11-9 to emit the sound corresponding to the expansion screen GG3 of the displays 11-3, 11-6 and 11-9.

The multi-speaker 2 delays the audio signal of the sound to be emitted from the loudspeakers 12L-4 through 12L-6 and the loudspeakers 12R-4 through 12R-6 to both sides of the displays 11-3, 11-6 and 11-9. The multi-speaker 2 controls the volume level of the audio signal of the sound to be emitted from the loudspeakers 12L-3 and 12R-3 and the loudspeakers 12L-9 and 12R-9 right above and right below the displays 11-3, 11-6 and 11-9. The multi-speaker 2 thus localizes sound in the vertical and horizontal directions.

As shown in FIG. 7, the loudspeakers 12L-4 through 12L-6 are farther from the displays 11-3, 11-6 and 11-9 than the loudspeakers 12R-4 through 12R-6 in the horizontal direction. By delaying the audio signal to the loudspeakers 12L-4 through 12L-6 by several samples, sound is localized on the expansion screen GG3 of the displays 11-3, 11-6 and 11-9. In the vertical direction, the loudspeakers 12L-3 and 12R-3 and the loudspeakers 12L-9 and 12R-9 have the same distance to the expansion screen GG3 of the displays 11-3, 11-6 and 11-9. Sound is localized on the expansion screen GG3 of the displays 11-3, 11-6 and 11-9 by performing the delay operation and the volume control operation, each operation having the same effect to a left component and a right component of the audio signal in a horizontal direction.

The multi-speaker 2 of FIG. 7 also assigns to the loudspeakers 12 volume parameters and delay parameters, as the ones listed in FIG. 5, set for the vertical and horizontal sound image localization on the active screen (screen GG3 of FIG. 7) (no corresponding parameter list is shown).

Figure 8:
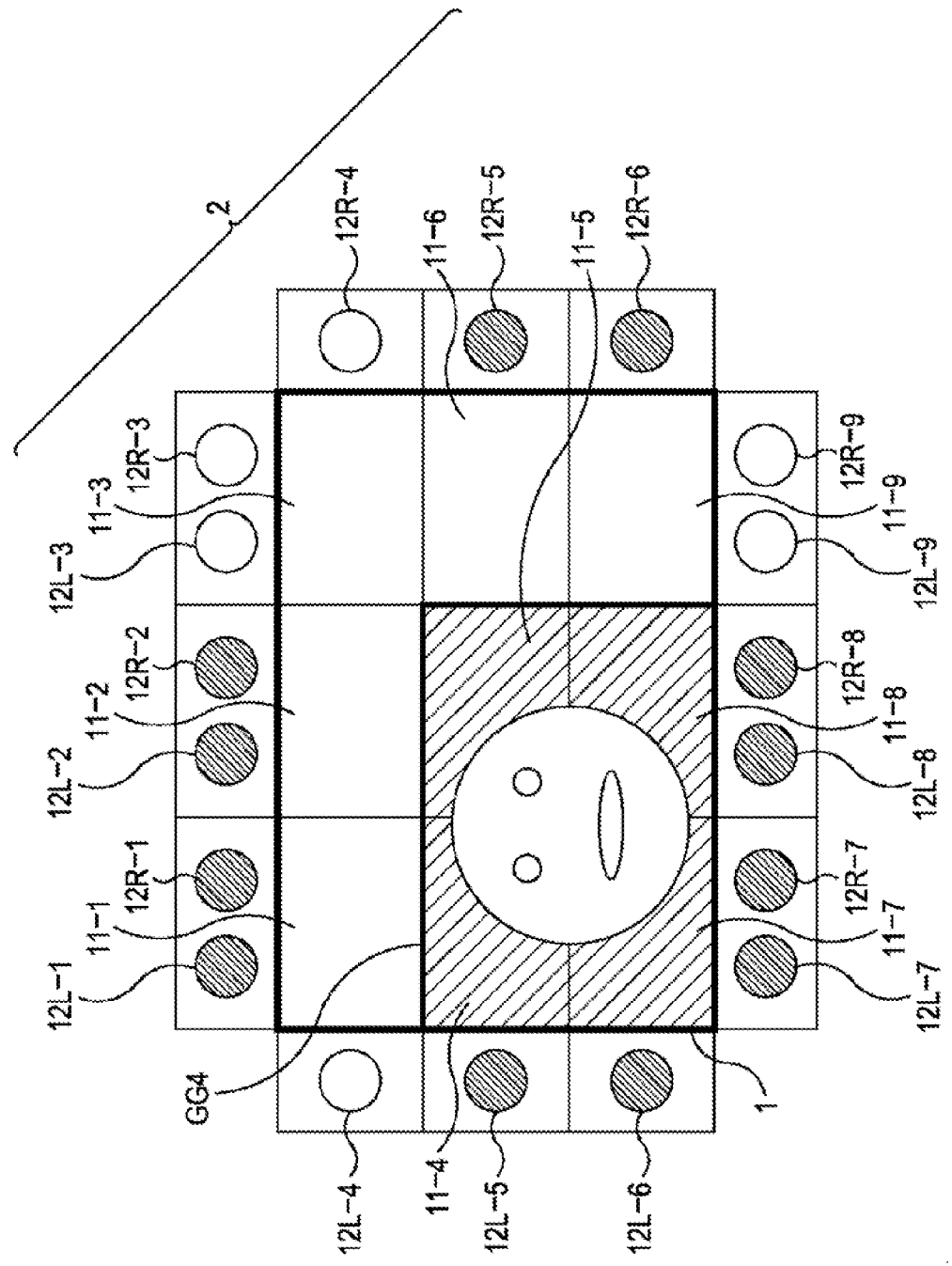
FIG. 8 illustrates still another example of the active screen of the multi-display apparatus of FIG. 1.

FIG. 8 illustrates another example of active screen on the multi-display apparatus of FIG. 1, namely, another example of the active screen of FIG. 4.

As shown in FIG. 8, from among the displays 11-1 through 11-9 arranged in an array of three rows by three columns, the first display 11-4 and the second display 11-5 on the intermediate row from the left and the first display 11-7 and the second display 11-8 on the bottom row from the left, as an active screen, display a screen GG4 of a face (an expansion screen on the displays 11-4, 11-5, 11-7 and 11-8).

To localize sound on the screen GG4 of the displays 11-4, 11-5, 11-7 and 11-8 as the active screen, the multi-speaker 2 drives only the loudspeakers 12L-1 and 12R-1 and the loudspeakers 12L-2 and 12R-2 right above the displays 11-4, 11-5, 11-7 and 11-8, the loudspeakers 12L-7 and 12R-7 and the loudspeakers 12L-8 and 12R-8 right below the displays 11-4, 11-5, 11-7 and 11-8, and the loudspeakers 12L-5 and 12R-5 and the loudspeakers 12L-6 and 12R-6 to both sides of the displays 11-4, 11-5, 11-7 and 11-8. The multi-speaker 2 thus causes these loudspeakers to emit the sound corresponding to the expansion screen GG4 of the displays 11-4, 11-5, 11-7 and 11-8.

The multi-speaker 2 delays the audio signal of the sound to be emitted from the loudspeakers 12L-5 and 12R-5 and the loudspeakers 12L-6 and 12R-6 arranged to both sides of the displays 11-4, 11-5, 11-7 and 11-8. The multi-speaker 2 controls the volume level of the audio signal of the sound to be emitted from the loudspeakers 12L-1 and 12R-1 and the loudspeakers 12L-2 and 12R-2 above the displays 11-4, 11-5, 11-7 and 11-8 and the loudspeakers 12L-7 and 12R-7 and the loudspeakers 12L-8 and 12R-8 below the displays 11-4, 11-5, 11-7 and 11-8. The multi-speaker 2 thus localizes sound in the vertical and horizontal directions.

As shown in FIG. 8, the loudspeakers 12R-5 and 12R-6 are farther from the center of the expansion screen GG4 of the displays 11-4, 11-5, 11-7 and 11-8 than the loudspeakers 12L-5 and 12L-6 in the horizontal direction. By delaying the audio signal to the loudspeakers 12R-6 and 12R-6 by several samples, sound is localized on the expansion screen GG4 of the displays 11-4, 11-5, 11-7 and 11-8. In the vertical direction, the loudspeakers 12L-1 and 12R-1 and the loudspeakers 12L-2 and 12R-2 are farther from the center of the expansion screen GG4 of the displays 11-4, 11-5, 11-7 and 11-8 than the loudspeakers 12L-7 and 12R-7 and the loudspeakers 12L-8 and 12R-8. By lowering a volume level of the loudspeakers 12L-1 and 12R-1 and the loudspeakers 12L-2 and 12R-2, sound is localized on the expansion screen GG4 of the displays 11-4, 11-5, 11-7 and 11-8.

The multi-speaker 2 of FIG. 8 also assigns to the loudspeakers 12 volume parameters and delay parameters, as the ones listed in FIG. 5, set for the vertical and horizontal sound image localization on the active screen (screen GG4 of FIG. 8) (no corresponding parameter list is shown).

Since the loudspeakers 12 forming the multi-speaker 2 surround the multi-display apparatus 1 from above, below and sideways in the multi-speaker system, the sound image is localized on the active screen that can be set at any position in the vertical and horizontal directions on the display screen of the multi-display apparatus 1.

In the known art, the user typically scans all screens and recognizes an active screen that is labeled with a marker. In contrast, in accordance with embodiments of the present invention, the user can intuitively recognize the active screen.

Localizing the sound image on a surface (screen) rather than on a point is important on the multi-speaker 2.

To achieve an accuracy level required to discriminate between sound image localizations at adjacent positions, the user needs to recognize a current localization point from a previous localization point when localization is shifted. Since the displays 11 of the multi-display apparatus 1 are arranged close to each other, it is difficult for the user to recognize a new localization point at the moment localization is shifted.

The multi-speaker 2 performs the delay operation to compensate for the arrival time difference between the two ears. To facilitate recognition of switching of the active screen, a difference between the two adjacent screens needs to be increased when an active screen is set on the displays 11. To this end, the sound image of the sound corresponding to the active screen is localized in a circle as shown in FIG. 9.

Figure 9:
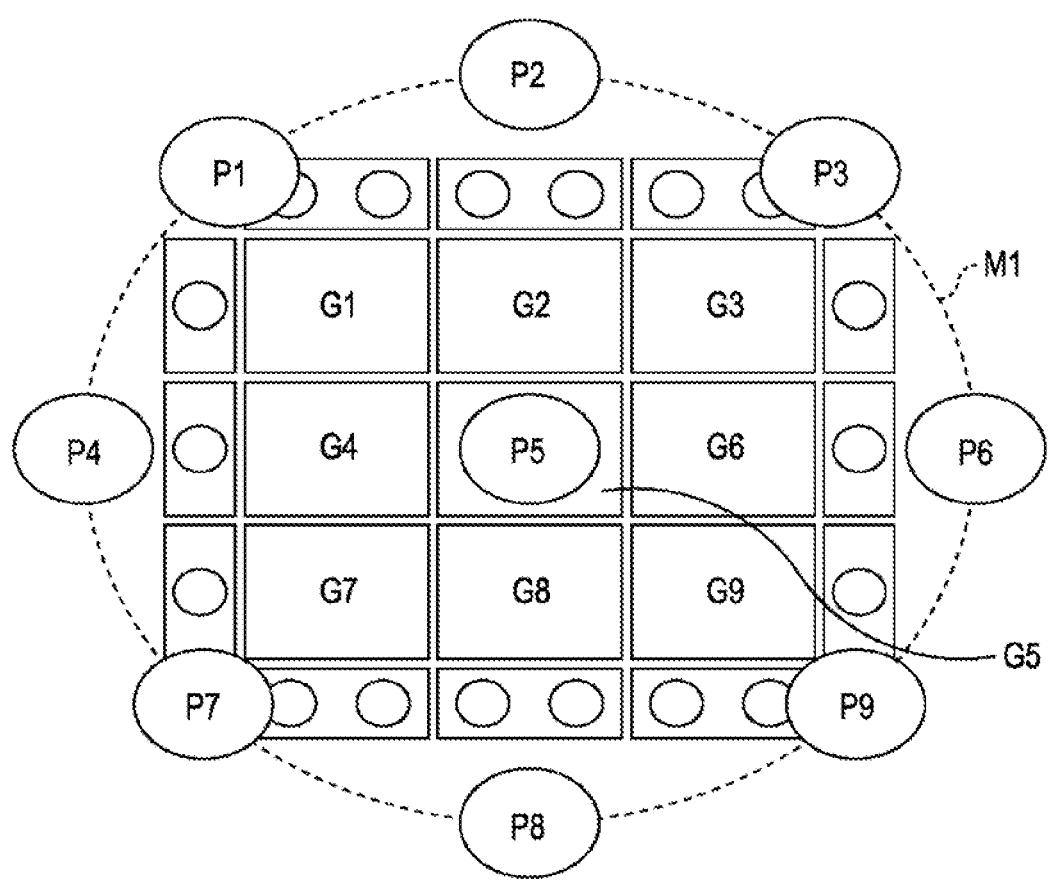
FIG. 9 illustrates sound image localization positions of the multi-display apparatus having nine screens.

FIG. 9 illustrates sound image localization positions. As shown in FIG. 9, reference numerals of each display 11 and each loudspeaker 12 are omitted. Screens G1 through G9 represents the displays 11-1 through 11-9 displaying different images. P1 through P9 represent sound image localization positions with the screens G1 through G9 of the displays 11-1 through 11-9 respectively set as an active screen.

When the screens G1 through G4 of the displays 11-1 through 11-4 and the screens G6 through G9 of the displays 11-6 through 11-9 are set as an active screen, the sound image localization positions P1 through P4 and the sound image localization positions P6 through P9 result. The sound image localization positions P1 through P4 and the sound image localization positions P6 through P9 are not on the screens but in a broken circle M1 surrounding the display screen (all screens G1 through G9) of the multi-display apparatus 1 and centered on the center position of the multi-display apparatus 1. As shown in FIG. 9, the sound image localization positions on the circle M1 are spaced at regular intervals along the circle M1.

More specifically, the sound image localization position P1 with the screen G1 of the display 11-1 set as the active screen is placed at an intersection where a line extending from the center of the multi-display apparatus 1 and passing through the screen G1 of the display 11-1 crosses the circle M1. The sound image localization position P2 with the screen G2 of the display 11-2 set as the active screen is placed at an intersection where a line extending from the center of the multi-display apparatus 1 and passing through the screen G2 of the display 11-2 crosses the circle M1. The sound image localization position P3 with the screen G3 of the display 11-3 set as the active screen is placed at an intersection where a line extending from the center of the multi-display apparatus 1 and passing through the screen G3 of the display 11-3 crosses the circle M1. The sound image localization position P4 with the screen G4 of the display 11-4 set as the active screen is placed at an intersection where a line extending from the center of the multi-display apparatus 1 and passing through the screen G4 of the display 11-4 crosses the circle M1.

The sound image localization position P6 with the screen G6 of the display 11-6 set as the active screen is placed at an intersection where a line extending from the center of the multi-display apparatus 1 and passing through the screen G6 of the display 11-6 crosses the circle M1. The sound image localization position P7 with the screen G7 of the display 11-7 set as the active screen is placed at an intersection where a line extending from the center of the multi-display apparatus 1 and passing through the screen G7 of the display 11-7 crosses the circle M1. The sound image localization position P8 with the screen G8 of the display 11-8 set as the active screen is placed at an intersection where a line extending from the center of the multi-display apparatus 1 and passing through the screen G8 of the display 11-8 crosses the circle M1. The sound image localization position P9 with the screen G9 of the display 11-9 set as the active screen is placed at an intersection where a line extending from the center of the multi-display apparatus 1 and passing through the screen G9 of the display 11-9 crosses the circle M1.

The sound image localization position P5 with the screen G5 of the display 11-5 at the center of the multi-display apparatus 1 set as the active screen is placed at the center of the multi-display apparatus 1.

When the sound image is localized on the screen of each display, the parameters for the delay operation and the volume control operation of each speaker are set so that the sound image localization positions are placed along the circle surrounding the display or at the center of the circle regardless of the number of displays and the size of the screen. Even with the displays placed close to each other, the user can immediately recognize a new sound image localization position at the moment the sound image localization position has changed. More specifically, the user can recognize the change of the active screen.

As shown in FIG. 9, the circle M1 is slightly elongated. A regular circle or an ellipse may be acceptable as long as it encloses all displays.

Figure 10:
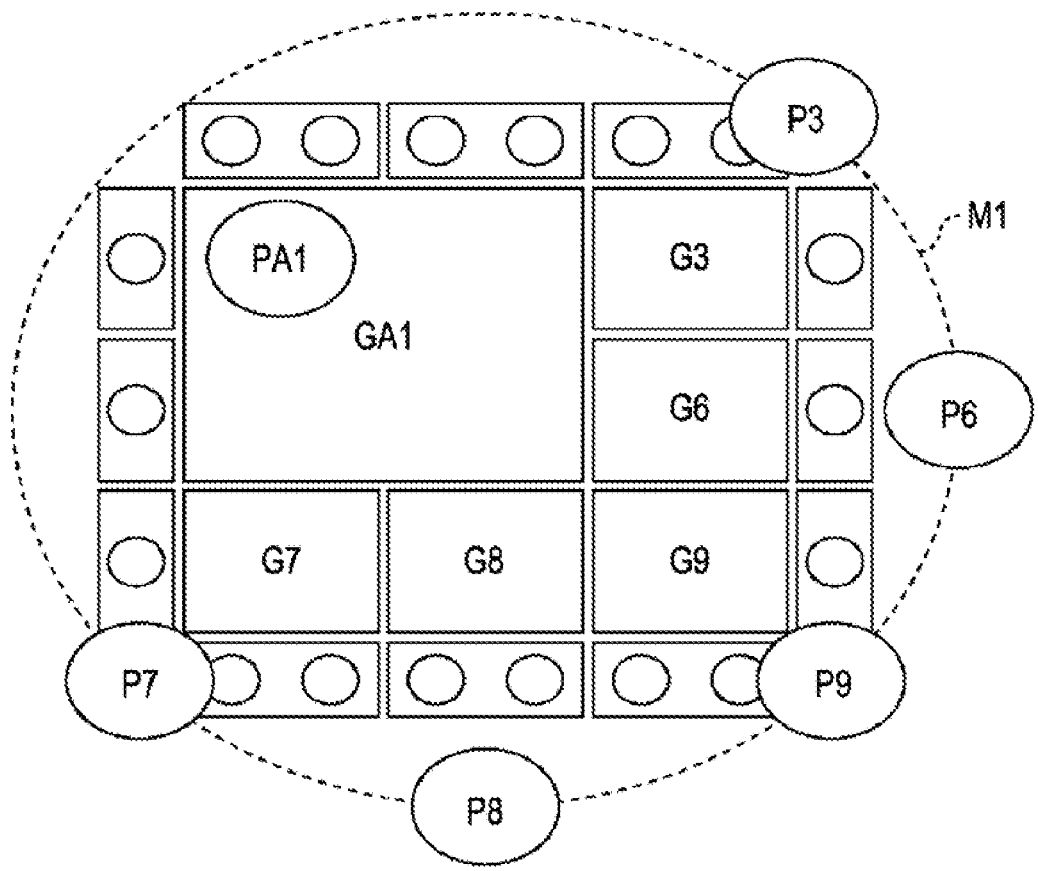
FIG. 10 illustrates sound image localization positions on the multi-display apparatus having a single expansion screen and five other screens.
Figure 11:
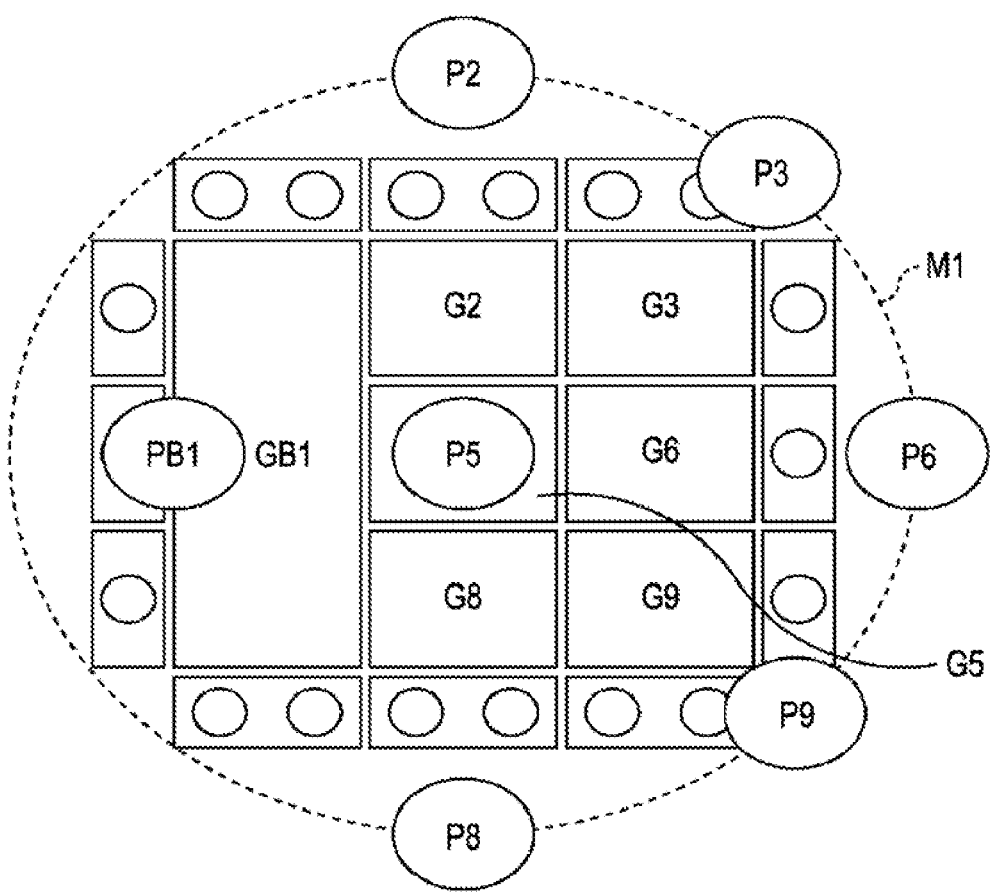
FIG. 11 illustrates sound image localization positions on the multi-display apparatus having a single expansion screen and six other screens.

As shown in FIG. 9, the screens G1 through G9 of the displays 11-1 through 11-9 display different images, and the multi-display apparatus 1 includes the nine screens. FIGS. 10 and 11 illustrate display examples in which a zoom screen is displayed. As shown, sound image localization positions surround screens displaying different images.

As shown in FIG. 10, an expansion screen GA1 corresponds displays 11-1, 11-2, 11-4 and 11-5, and screen G3, screen G6, screens G7 through G9 respectively correspond to screens of displays 11-3, 11-6, 11-7 through 11-9 displaying different images. PA1, P3, P6 and P7 through P9 respectively represent sound image localization positions of the expansion screen GA1, the screen G3, the screen G6 and the screens G7 through G9.

More specifically, each of the screens G3, G6 and G7 through G9 of the displays 11-3, 11-6 and 11-7 through 11-9 is set as the active screen. In the same manner as discussed with reference to FIG. 9, the parameters for the volume control operation and the delay operation on the loudspeakers 12 are set so that the sound image localization positions P3, P6 and P7 through P9 are placed along a circle M1 enclosing the display screen of the multi-display apparatus 1 centered on the center of the multi-display apparatus 1.

Even with the zoom screen displayed with the other displays close to each other, the user can immediately recognize a new sound image localization position at the moment the sound image localization position has changed. More specifically, the user can recognize the change of the active screen.

The sound image localization position PA1 with the expansion screen GA1 of the displays 11-1, 11-2, 11-4 and 11-5 selected as an active screen is placed not at the center of the expansion screen GA1 but at a position within the display 11-1 far from the side of the remaining screens G3, G6 and G7 through G9. The parameters for the volume control operation and the delay operation on the loudspeakers 12 are set to place the sound image localization position PA1 at such a position.

When the sound image has shifted from any of the screens G3, G6 and G7 through G9 to the expansion screen GA1, the user can easily recognize the shifting of the sound image.

As shown in FIG. 11, an expansion screen GB1 corresponds displays 11-1, 11-4 and 11-7, and screens G2, G3, G5, G6, G8 and G9 respectively correspond to screens of displays 11-2, 11-3, 11-5, 11-6, 11-8 and 11-9 displaying different images. PB1, P2, P3, P5, P6, P8 and P9 respectively represent sound image localization positions of the expansion screen GB1, G2, G3, G5, G6, G8 and G9 selected as the active screen.

More specifically, the sound image localization positions P2, P3, P6, P8 and P9 result when the screens G2, G3, G6, G8 and G9 of the displays 11-2, 11-3, 11-6, 11-8 and 11-9 are respectively selected of as the active screen. In the same manner as shown in FIG. 10, the parameters for the volume control operation and the delay operation on the loudspeakers 12 are set so that the sound image localization positions P2, P3, P6, P8 and P9 are placed in a circle M1 enclosing the display screen of the multi-display apparatus 1 and centered on the center of the multi-display apparatus 1. A sound image localization position P5 results when the screen G5 of the display 11-5 arranged in the center of the multi-display apparatus 1 is selected as the active screen. The parameters for the volume control operation and the delay operation on the loudspeakers 12 are set so that the sound image localization position P5 is placed on the center of the multi-display apparatus 1.

Even with the zoom screen displayed with the other displays close to each other, the user can immediately recognize a new sound image localization position at the moment the sound image localization position has changed. More specifically, the user can recognize the change of the active screen.

The sound image localization position PB1 results when the expansion screen GB1 of the displays 11-1, 11-4 and 11-7 is set as the active screen. The parameters for the volume control operation and the delay operation for the loudspeakers 12 are set so that the sound image localization position PB1 is placed not in the center of the expansion screen GB1 but at a left position within the expansion screen GB1 far from the other screens G2, G3, G5, G6, G8 and G9.

When the sound image has shifted from any of the screens G2, G3, G5, G6, G8 and G9 to the expansion screen GB1, the user can easily recognize the shifting of the sound image.

Sound expression with the zoom screen (expansion screen) set as the active screen is described below with reference to FIG. 12.

Figure 12:
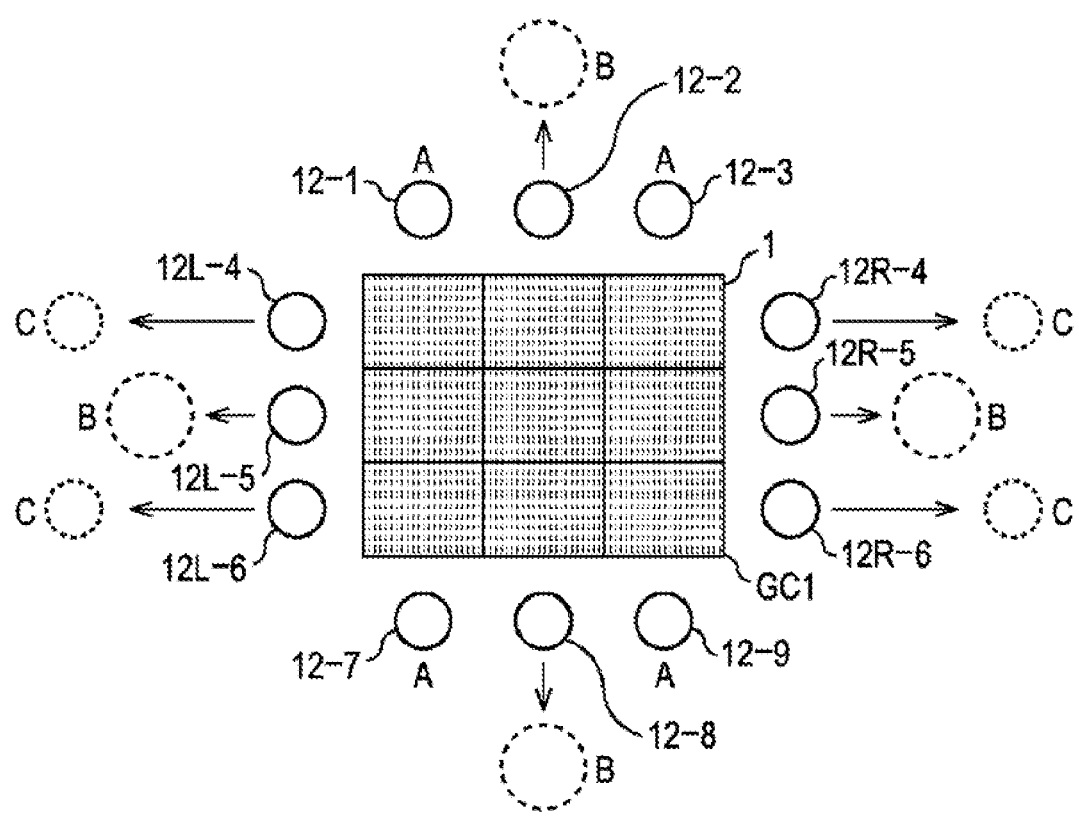
FIG. 12 illustrates a sound expression with the expansion screen set to be active.

As shown in FIG. 12, an expansion screen GC1 (shadowed area) composed of the nine displays 11-1 through 11-9 in the multi-display apparatus 1 is displayed. The expansion screen GC1 is different from the expansion screen GB1 of FIG. 11 and screen GG2 in screen size and image size. The sound expression is also changed accordingly.

While the sound image is sharp-focused to be localized at the center of the expansion screen GC1 on one hand, the sound is broadened in accordance with displaying of an image and the size of the image on the other hand. In the multi-speaker system, these originally contradictive factors are assigned to a plurality of loudspeakers 12 and parameters satisfying assignments are thus set.

More specifically, solid circles around the expansion screen GC1 represent layout positions of the loudspeakers, and the size of each circle represents the intensity of sound. The length of each arrow-headed line represents the amount of delay. Each broken circle represents a delayed sound, and the size of the broken circle represents the intensity of delay-adjusted sound. Loudspeakers 12-1 through 12-3 arranged from left to right above the expansion screen GC1, loudspeakers 12-7 through 12-9 are arranged from left to right below the expansion screen GC1, loudspeakers 12L-4 through 12L-6 are arranged from top to bottom on the left side of the expansion screen GC1 and loudspeakers 12R-4 through 12R-6 are arranged from to top to bottom on the right side of the expansion screen GC1.

For convenience of explanation with reference to FIG. 12, the loudspeakers 12L-1 and 12R-1 are referred to as the loudspeaker 12-1, the loudspeakers 12L-2 and 12R-2 are referred to as the loudspeaker 12-2, the loudspeakers 12L-3 and 12R-3 are referred as the loudspeaker 12-3, the loudspeakers 12L-7 and 12R-7 are referred to the loudspeaker 12-7, the loudspeakers 12L-8 and 12R-8 are referred to as the loudspeaker 12-8 and the loudspeakers 12L-9 and 12R-9 are referred to as the loudspeaker 12-9.

In the speaker system of FIG. 12, the pair of loudspeakers 12-1 and 12-7 and the pair of loudspeakers 12-3 and 12-9 emit a sound serving as a standard for the expansion screen GC1 as represented by the circle A. The sound image is thus sharp-focused to be localized at the center of the expansion screen GC1.

The audio signals to be applied to the pair of loudspeakers 12-2 and 12-8 and the pair of loudspeakers 12L-5 and 12R-5, arranged in a cross configuration, are delayed by a slight amount with reference to the audio signal corresponding to the expansion screen GC1 as represented by a short arrow-headed line. Also as represented by a circle B, the pair of loudspeakers 12-2 and 12-8 and the pair of loudspeakers 12L-5 and 12R-5 emit sounds corresponding to the expansion screen GC1 at a level higher than the standard sound level. The emitted sounds are broadened so that the sound image represents the size of the expansion screen GC1.

As represented by a circle C, the pair of loudspeakers 12L-4 and 12R-4 and the pair of loudspeakers 12L-6 and 12R-6, arranged on both sides of the expansion screen GC1, emit the sound corresponding to the expansion screen GC1 at the same level as the standard sound. As represented by a long arrow-headed line, the audio signal corresponding to the expansion screen GC1 is delayed by a large amount, and thus the emitted sound is further broadened, namely, echoed.

As shown in FIG. 12, the loudspeaker pairs arranged above and below the expansion screen GC1 (loudspeakers 12-1 and 12-7 and loudspeakers 12-3 and 12-9) are assigned functions of sharp-focusing the sound image, outputting the sound serving as the standard, and localizing the sound image at the center of the expansion screen GC1. The other loudspeaker pair (loudspeakers 12-2 and 12-8) arranged above and below the expansion screen GC1 and the loudspeaker pair arranged on both sides of the expansion screen GC1 (loudspeakers 12L-5 and 12R-5) are assigned a function of broadening the sound corresponding to the expansion screen GC1. The other loudspeaker pairs arranged on both sides (loudspeakers 12L-4 and 12R-4 and loudspeakers 12L-6 and 12R-6) are assigned a function of further broadening, namely, echoing the sound.

When the zoom screen is set as the active screen, a plurality of loudspeakers are assigned functions. More specifically, by performing an audio signal process in accordance with a parameter responsive to a function, the multi-display apparatus 1 can output a sound in response to the size of a screen and the size of a displayed image.

Figure 13:
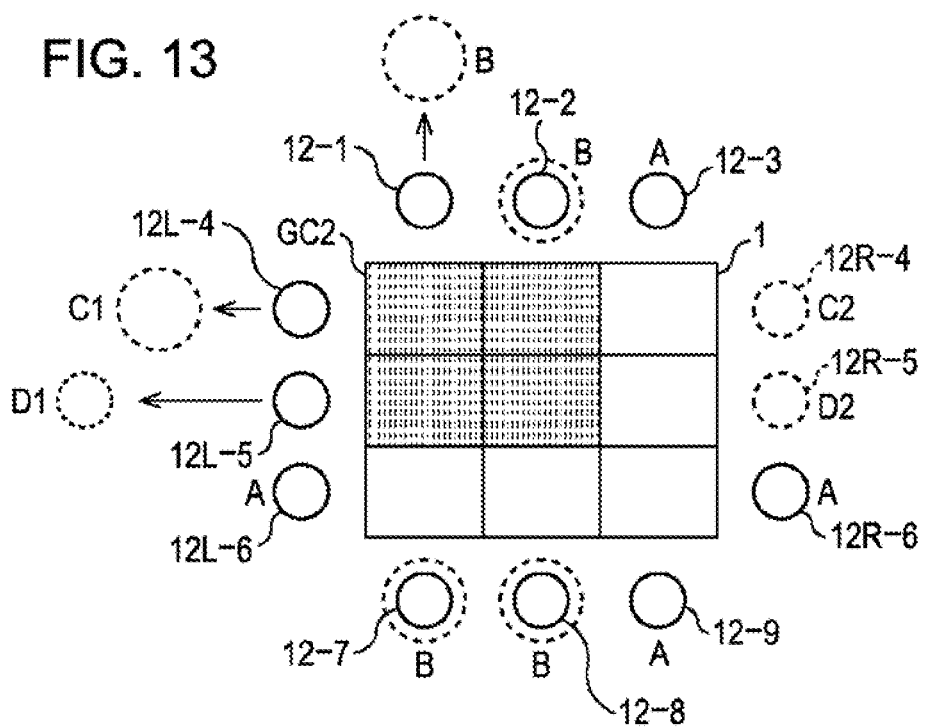
FIG. 13 illustrates another sound expression with the expansion screen set to be active.

FIG. 13 illustrates another example of the sound expression of FIG. 12. As shown in FIG. 13, four displays 11-1, 11-2, 11-4 and 11-5 from among the nine displays 11-1 through 11-9 work in cooperation to form an expansion screen GC2 (shadowed portion) to display one program.

In the speaker system of FIG. 13, the pair of loudspeakers 12-3 and 12-9 above and below the expansion screen GC2 and the pair of loudspeakers 12L-6 and 12R-6 to both sides of the expansion screen GC2 emit the sound as the standard level as represented by a circle A.

The pair of loudspeakers 12-1 and 12-7 and the pair of loudspeakers 12-2 and 12-8 above and below the expansion screen GC2 emit the sound corresponding to the expansion screen GC2 higher in intensity than the standard sound as represented by the circle B. The sound image is thus localized at the center of the expansion screen GC2 placed in the leftward position of the multi-display apparatus 1. As represented by a short arrow-headed line, the audio sound applied to the loudspeaker 12-1 is delayed to broaden the sound. The sound image thus represents the size of the expansion screen GC2.

The loudspeaker 12R-4 of the pair of loudspeakers 12L-4 and 12R-4 arranged to both sides of the expansion screen GC2 emits the sound responsive to the expansion screen GC2 at the standard sound level as represented by a circle C2. The loudspeaker 12L-4 emits the sound responsive to the expansion screen GC2 delayed by a small amount, as represented by a short arrow-headed line, and at a level higher than the standard sound level as represented by a circle C1. The sound is thus broadened so that the sound image represents the size of the expansion screen GC2 placed on the leftward position in the multi-display apparatus 1.

The loudspeaker 12R-5 of the pair of the loudspeakers 12L-5 and 12R-5 arranged to both sides of the expansion screen GC2 emits the sound corresponding to the expansion screen GC2 at the standard sound level as represented by a circle D2. The loudspeaker 12R-5 emits the sound corresponding to the expansion screen GC2 delayed by a large amount, as represented by a long arrow-headed line, and at the standard sound level as represented by a circle D1. The sound is thus further broadened, namely, echoed.

More specifically as shown in FIG. 13, the loudspeaker pairs arranged above, below and to both sides of the screen (loudspeakers 12-3 and 12-9 and loudspeakers 12L-6 and 12R-6) are assigned functions of sharp-focusing the sound image, and outputting the sound serving as the standard. The loudspeaker pairs arranged above and below the expansion screen GC2 (loudspeakers 12-1 and 12-7 and loudspeakers 12-2 and 12-8) are assigned a function of localizing the sound image at the center of the expansion screen GC2. The loudspeaker pair arranged to both sides of the expansion screen GC2 (loudspeakers 12L-4 and 12R-4) is assigned a function of broadening the sound. The loudspeaker pair arranged to both sides of the expansion screen GC2 (loudspeakers 12L-5 and 12R-5) is assigned a function of further broadening the sound, namely, echoing the sound.

In the case illustrated in FIG. 13 as well, the plurality of loudspeakers are assigned the functions. By performing the audio signal process in accordance with the parameter responsive to the function, the multi-display apparatus 1 can output the sound in response to the size of the screen and the size of a displayed image.

Figure 14:
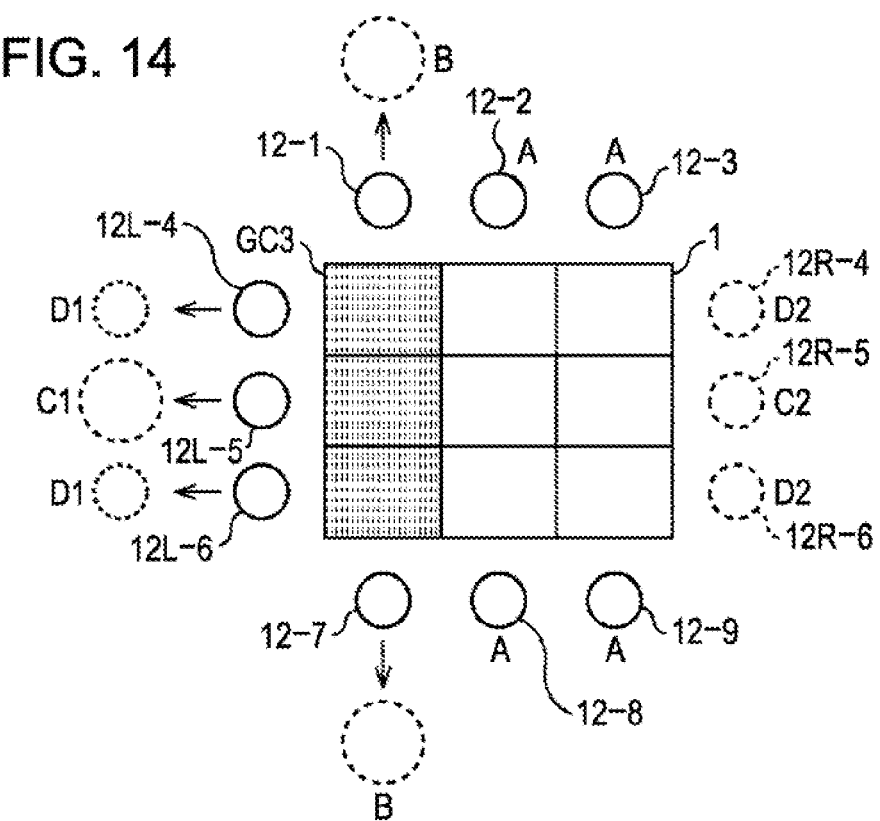
FIG. 14 illustrates yet another sound expression with the expansion screen set to be active.

FIG. 14 illustrates another example of the sound expression of FIG. 12. As shown in FIG. 14, three displays 11-1, 11-4 and 11-7 out of the displays 11-1 through 11-9 work to form an expansion screen GC3 (shadowed portion) displaying an image of one program.

In the speaker system of FIG. 14, the pair of loudspeakers 12-2 and 12-8 and the pair of loudspeakers 12-3 and 12-9 above and below the screen other than the expansion screen GC3 emit the sound corresponding to the expansion screen GC3 at the standard sound level as represented by a circle A.

The pair of loudspeakers 12-1 and 12-7 above and blow the expansion screen GC3 emits the sound corresponding to the expansion screen GC3 delayed by a small amount as represented by a short arrow-headed line and at a sound level higher than the standard sound level as represented by a circle B. The sound image is thus localized at the center of the expansion screen GC3 placed in the leftward position in the multi-display apparatus 1. The sound is thus broadened so that the sound image represents the size of the expansion screen GC3.

The loudspeaker 12R-5 of the pair of loudspeakers 12L-5 and 12R-5 arranged on both sides of the expansion screen GC2 emits the sound corresponding to the expansion screen GC2 at the standard sound level as represented by a circle C2. The loudspeaker 12L-5 emits the sound corresponding to the expansion screen GC2 delayed by a small amount, as represented by a short arrow-headed line, and at a sound level higher than the standard sound level as represented by a circle C1. The sound is thus broadened so that the sound image represents the size of the expansion screen GC3 placed at a leftward position in the multi-display apparatus 1.

From among the loudspeaker pair loudspeakers of 12L-4 and 12R-4 and the loudspeaker pair of loudspeakers 12L-6 and 12R-6 on both sides of the expansion screen GC3, the loudspeakers 12R-4 and 12R-6 emit the sound corresponding to the expansion screen GC3 at the standard sound level as represented by a circle D2. The loudspeakers 12L-4 and 12L-4 emit the sound corresponding to the expansion screen GC3 delayed by a small amount as represented by a short arrow-headed line and at the standard sound level as represented by a circle D1. The sound is thus broadened so that the sound image represents the size of the expansion screen GC3 placed at a leftward position in the multi-display apparatus 1.

More specifically as shown in FIG. 14, the loudspeaker pairs arranged above and below the expansion screen GC3 (loudspeakers 12-2 and 12-8 and loudspeakers 12-3 and 12-9) are assigned functions of sharp-focusing the sound image, and outputting the sound at the standard sound level. The loudspeaker pair arranged above and below the expansion screen GC3 (loudspeakers 12-1 and 12-7) is assigned a function of localizing the sound image at the center of the expansion screen GC3. The loudspeaker pairs arranged on both sides of the expansion screen GC3 (loudspeakers 12L-4 and 12R-4, loudspeakers 12L-5 and 12R-5 and loudspeakers 12L-6 and 12R-6) are assigned a function of broadening the sound. The expansion screen GC3 is not echoed because of the elongated shape thereof.

In the case illustrated in FIG. 14 as well, the plurality of loudspeakers are assigned the functions. By performing the audio signal process in accordance with the parameter responsive to the function, the multi-display apparatus 1 can output the sound in response to the size of the screen and the size of a displayed image.

An audio output control process performed by the speaker engine 33 is described in detail below with reference to a flowchart of FIG. 15.

In step S11, the controller 54 transmits to the main controller 32 information regarding the state of the speaker engine 33 (the state of the speaker engine 33 connected to the main controller 32 and the configuration of the multi-speaker 2) as information regarding own engine while also receiving information from another engine (such as another speaker engine 33 or a video engine 34) via the main controller 32. The controller 54 supplies the information from the other engine to the audio signal processor 53.

In step S12, the audio signal processor 53 selects the parameter group relating to the audio signal process of the corresponding loudspeakers 12L, 12R and 12B in response to the information from the other engine.

The audio signal processor 53 recognizes the configuration of the multi-display apparatus 1 and the multi-speaker 2 (regarding the number and layout of displays 11 forming the multi-display apparatus 1 and the number and layout of loudspeakers 12 forming the multi-speaker 2) based on the received state of the video engine 34 and the speaker engine 33. The audio signal processor 53 acquires the ID numbers of the corresponding loudspeakers 12L, 12R and 12B in the multi-speaker 2. The audio signal processor 53 thus selects the parameter group relating to the audio process in accordance with the configuration of the multi-display apparatus 1 and the multi-speaker 2 and the ID numbers of the loudspeakers 12L, 12R and 12B in that configuration.

The parameter group is pre-set based on a variety of active screens and image sizes in accordance with the above-described sound localization and sound expression. Steps S11 and S12 of FIG. 15 may be performed only when one of a speaker engine 33 and a video engine 34 is newly connected or disconnected.

A plurality of tuners in the tuner unit 31 select reception bands of broadcast signals received via the antenna (not shown) from a broadcasting station, demodulates the broadcast signal in the selected reception band, and outputs the video signal and audio signal of the demodulated signal to the main controller 32. The main controller 32 outputs the audio signal of the active screen set by the user to the speaker engine 33 while also outputting the audio signal of another program on another channel.

In step S13, the DA converter 55-1 receives the audio signals (left audio signal and right audio signal) corresponding to the active screen from the main controller 32 as speaker output signals (left speaker output signal and right speaker output signal) and then outputs the audio signals to the AD converter 52-1. The left and right speaker output signals from the DA converter 55-1 are analog-to-digital converted by the AD converter 52-1 and the resulting digital left and right speaker output signals are output to the audio signal processor 53.

In step S14, the audio input unit 51-2 receives audio signals of at least one channel (a left audio signal and a right audio signal) other than the audio signals for the active screen from the main controller 32 as sub channel audio signals (a sub channel left audio signal and a sub channel right audio signal) and outputs the audio signals to the AD converter 52-2. The AD converter 52-2 analog-to-digital converts the sub channel left audio signal and the sub channel right audio signal from the audio input unit 51-2 and outputs the digital sub channel left audio signal and sub channel right audio signal to the audio signal processor 53.

In step S15, the monitoring processor 53a analyzes the sub channel audio signals input from the AD converter 52-2 and monitors the audio signal of an emergency broadcast program in the sub channel audio signal to determine whether the emergency broadcast signal is detected. If it is determined in step S15 that no emergency broadcast signal is detected, processing proceeds to step S16. The audio signal processor 53 processes the speaker output signal from the AD converter 52-1. The audio signal process performed herein will be described later with reference to FIG. 16.

In the audio signal process of the speaker output signal in step S16, the parameter is selected from the parameter group in accordance with the process result of the speaker engine 33 and the video engine 34 (for example, relating to the position and size of the active screen in the multi-display apparatus 1). The audio process responsive to the selected parameter is performed on the speaker output signal from the AD converter 52-1.

The full range left audio signal and right audio signal thus processed are output to the DA converter 55-1 while the bass audio signals thus processed are output to the DA converter 55-2. The DA converter 55-1 digital-to-analog converts the audio processed, full range left audio signal and right audio signal from the audio signal processor 53 and outputs resulting analog left audio signal and right audio signal to the volume controller 56-1. The DA converter 55-2 digital-to-analog converts the audio processed, bass audio signal and outputs the resulting analog bass audio signal to the volume controller 56-2.

In step S17, the volume controller 56-1 under the control of the controller 54 controls the volume of the analog left audio signal and the analog right audio signal from the DA converter 55-1, thereby outputting the volume controlled analog left audio signal and analog right audio signal to the loudspeakers 12L and 12R via the amplifiers 41L and 41R. A left sound responsive to the signal processed left audio signal and a right sound responsive to the signal processed right audio signal are emitted from the loudspeakers 12L and 12R, respectively.

The volume controller 56-2 under the control of the controller 54 controls the volume level of the analog bass audio signal from the DA converter 55-2 and outputs the volume controlled bass audio signal to the loudspeaker 12B via the amplifier 41B. A bass sound responsive to the signal processed bass audio signal is thus output from the loudspeaker 12B.

The emergency broadcast signal is accompanied by a characteristic effect sound. If the characteristic effect sound is detected from the sub channel audio signal, it is determined that the emergency broadcast signal has been detected. Processing proceeds to step S18.

In step S18, the audio signal processor 53 causes the loudspeakers 12L, 12R and 12B to emit a predetermined sound to notify of the emergency broadcast signal.

The audio signal processor 53 generates audio signals (a left audio signal, a right audio signal and a bass audio signal) responsive to the predetermined sound to notify the user of the emergency broadcast signal, supplies the generated left audio signal and right audio signal to the loudspeakers 12L and 12R via the DA converter 55-1 and the volume controller 56-1. The loudspeakers 12L and 12R thus emit the respective sounds. The audio signal processor 53 also supplies the generated bass audio signal to the loudspeaker 12B via the DA converter 55-2 and the volume controller 56-2.

In step S19, the audio signal processor 53 supplies the detection result of the emergency broadcast signal to the other speaker engine 33 and the video engines 34 via the controller 54 and the main controller 32.

Even if the other speaker engine 33 has not detected the emergency broadcast signal, the other speaker engine 33 performs step S20 and subsequent steps in response to the detection result of the emergency broadcast signal. It is also possible to allow the image of a program bearing the emergency broadcast signal to be displayed on the display 11. In response to the detection result of the emergency broadcast signal, the video engine 34 may cause the display 11 to display a message asking the user whether to switch to "an emergency broadcast program." In response to the user's selection, step S20 and subsequent steps may be performed.

In step S20, the audio signal processor 53 performs the audio signal process on the sub channel audio signal instead of the speaker output signal. The audio signal process in step S20 is substantially identical to the audio signal process in step S16 to be discussed in detail later with reference to FIG. 16, but the signal processed in step S20 is different from the signal processed in step S16.

In the audio signal process of the speaker output signal in step S20, the parameter is selected from the parameter group in accordance with the process result of the speaker engine 33 and the video engine 34 (for example, relating to the position and size of the active screen in the multi-display apparatus 1). The audio process responsive to the selected parameter is performed on the sub channel audio signal from the AD converter 52-2.

The full range left audio signal and right audio signal thus processed are output to the DA converter 55-1 while the bass audio signals thus processed are output to the DA converter 55-2. The DA converter 55-1 digital-to-analog converts the audio processed, full range left audio signal and right audio signal from the audio signal processor 53 and outputs resulting analog left audio signal and right audio signal to the volume controller 56-1. The DA converter 55-2 digital-to-analog converts the audio processed, bass audio signal and outputs the resulting analog bass audio signal to the volume controller 56-2.

In step S21, the volume controller 56-1 under the control of the controller 54 controls the volume levels of the analog left audio signal and the analog right audio signal from the DA converter 55-1, thereby outputting the volume controlled analog left audio signal and analog right audio signal to the loudspeakers 12L and 12R via the amplifiers 41L and 41R. A left sound responsive to the signal processed left audio signal of the sub channel and a right sound responsive to the signal processed right audio signal of the sub channel are emitted from the loudspeakers 12L and 12R, respectively.

The volume controller 56-2 under the control of the controller 54 controls the volume level of the analog bass audio signal from the DA converter 55-2 and outputs the volume controlled bass audio signal to the loudspeaker 12B via the amplifier 41B. A bass sound responsive to the signal processed bass audio signal is thus output from the loudspeaker 12B.

The detected emergency broadcast signal in the sub channel audio signal is output from the loudspeakers 12L, 12R and 12B.

The speaker engine 33 receives the sub channel audio signal other than the speaker output signal as described above. The sub channel audio signal is processed, and the processed sub channel audio signal is then accounted for in the audio signal output process.

Figure 15:
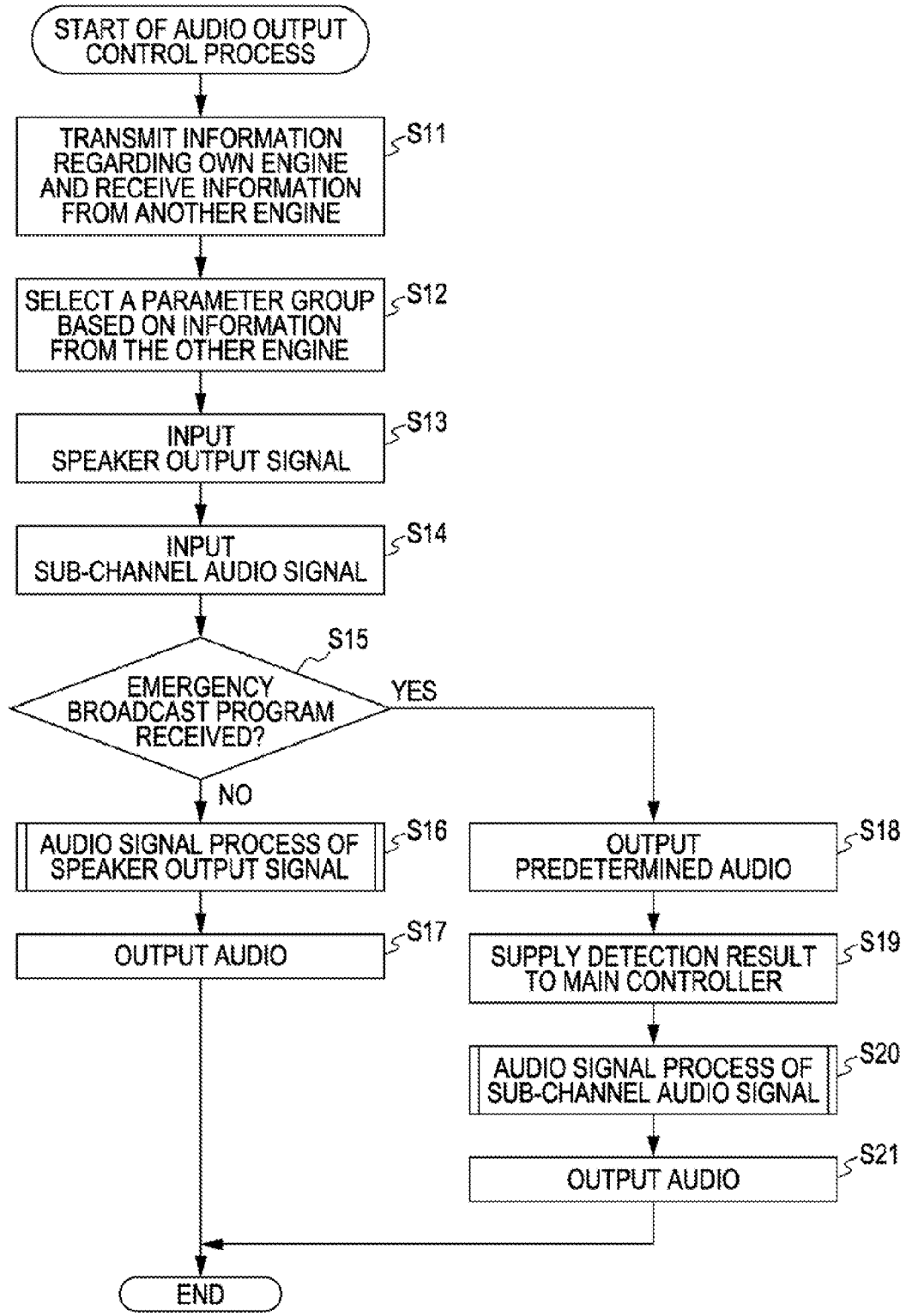
FIG. 15 is a flowchart illustrating an audio output control process of the speaker engine of FIG. 2.

In the discussion with reference to FIG. 15, the speaker engine 33 switches the audio signal from the speaker output signal to the sub channel audio signal. Optionally in step S19, the main controller 32 may be designed to output the audio signal of the program bearing the detected emergency broadcast signal to the speaker engine 33 as the speaker output signal. In this case, the speaker engine 33 processes the speaker output signal, thereby causing the loudspeaker 12 to output the audio signal of the program bearing the emergency broadcast signal.

One of an emergency broadcast program and a quick report is detected from the sub channel audio signal as described above with reference to FIG. 15. Furthermore, break-in news may be detected by detecting a characteristic effect sound, one of a commercial or a climax scene may be detected by monitoring a change in volume level, a pre-registered audio pattern (such as an opening of a broadcast program, a start of a predetermined session in a broadcast program, words of a particular speaker, etc.) may be detected through a matching technique.

In the above discussion, the sub channel audio signal is input and monitored. The input signal is not limited to the audio of broadcast programs. For example, a microphone may be used and a sound picked up by the microphone may be sensed and input to the system.

The audio signal process in step S16 of FIG. 15 is described below with reference to a flowchart of FIG. 16. The audio signal process is performed by the audio signal processor 53 of FIG. 17 in the multi-display apparatus 1 of FIG. 9 that includes the nine screens with one of the screens set as the active screen.

FIG. 17 illustrates in detail the audio signal processor 53 that performs the audio signal process. With reference to FIG. 17, solid lines represent the flow of an input signal (one of the speaker output signal and the sub channel audio signal) and broken lines represent the flow of one of an instruction signal and a control signal. The solid lines represent a single system. In practice, two audio signals of left and right channels are input to the audio signal processor 53 and signals of three channels, including left and right audio signals and a bass audio signal are output from the audio signal processor 53.

The audio signal processor 53 of FIG. 17 includes a frequency analyzing unit 101, a parameter memory 102, a delay adjuster 103 and a volume adjuster 104. The input signal (audio signal) from the AD converter 52-1 is supplied to each of the frequency analyzing unit 101 and the delay adjuster 103. An active screen identification signal from the video engine 34 displaying the active screen is supplied to the parameter memory 102 via the speaker engine 33 and the controller 54.

The frequency analyzing unit 101 detects a frequency component of the input signal and supplies the detected frequency component to the parameter memory 102.

The parameter memory 102 stores the parameter group responsive to the loudspeakers 12 in a variety of configurations of the multi-display apparatus 1 and the multi-speaker 2. The parameter group is set based on the sound image localization and the sound expression discussed above. The parameter group includes parameters accounting for the position and size of the multi-display apparatus 1 and the ratio of a high-frequency component and a low-frequency component.

The parameter memory 102 selects the parameter group in response to the states of the video engines 34 and the states of the other speaker engines 33 supplied from the controller 54. The parameter memory 102 further selects, from the parameter group, parameters (such as a delay operation amount and a volume control operation amount) in accordance with the active screen identification signal supplied from the controller 54 and the ratio of the low frequency component to the high frequency component contained in the frequency component from the frequency analyzing unit 101. In response to the selected parameters, the parameter memory 102 controls the delay adjuster 103 and the volume adjuster 104.

A variety of signals, such as music, a television broadcast audio signal, and a radio broadcast audio signal, are contemplated as the input audio signals in the multi-speaker system. As previously discussed with reference to FIG. 6, contribution of the delay operation and the volume control operation to the sound image localization greatly depends on the frequencies contained in the input signal. Each operation affects the sound image localization as discussed below. Since an input audio signal needs to have a relatively long wavelength for humans to feel a delay in the audio signal, the low frequency component contained in the input signal is thus important. Since the high frequency component provides high directivity of the sound on the other hand, the volume control operation also greatly affects the sound image localization.

The parameter memory 102 determines optimum parameters (the delay operation amount and the volume control operation amount) at the ratio of the low frequency component to the high frequency component contained in the frequency component detected by the frequency analyzing unit 101. The parameter memory 102 can thus localize the sound image in a manner free from the input signal.

The delay adjuster 103 under the control of the parameter memory 102 delays the input signal and outputs the delayed audio signal to the volume adjuster 104. The volume adjuster 104 under the control of the parameter memory 102 raises or lowers the volume level of the audio signal from the delay adjuster 103 and outputs the volume controlled signal to each of the DA converter 55-1 and the DA converter 55-2.

Returning to FIG. 16, the audio signal process of the audio signal processor 53 of FIG. 17 is further described. The input signal from the AD converter 52-1 is input to each of the frequency analyzing unit 101 and the delay adjuster 103.

In step S31, the frequency analyzing unit 101 analyzes the frequency of the input signal and supplies the frequency component as the analysis result to the parameter memory 102. The input frequency can be constantly analyzed. In practice, however, the parameter memory 102 may analyze the frequency component at the moment the user presses a channel button. The frequency analyzing unit 101 may further analyze the signal in time domain, namely, how many times the signal crosses a predetermined frequency.

In step S32, the parameter memory 102 supplies the active screen identification signal from the main controller 32 displaying the active screen to each of the main controller 32 and the controller 54.

In step S33, the parameter memory 102 selects, from the parameter group selected in step S12 of FIG. 15, parameters corresponding to the frequency analysis result from the frequency analyzing unit 101 and the active screen identification signal. In the case of FIG. 4, namely, when the screen GG1 of the display 11-1 is active, the parameters of FIG. 5 are selected.

In step S34, the parameter memory 102 controls the delay adjuster 103, thereby causing the delay adjuster 103 to delay the input signal in response to the selected parameter. In the case of the loudspeakers 12L-4 and 12R-4 of FIG. 4, the delay adjuster 103 delays only the right audio signal to be output to the loudspeaker 12R-4 by 50 units as shown in FIG. 5. The delayed audio signal is then output to the volume adjuster 104.

In step S35, the parameter memory 102 controls the volume adjuster 104, thereby causing the volume adjuster 104 to adjust the volume level of the delayed signal in response to the selected parameter and then outputs the volume controlled audio signal to each of the DA converter 55-1 and the DA converter 55-2. As shown in FIG. 5, the volume adjuster 104 sets to 0.5 each of the ratio of the right audio signal to be output to the loudspeaker 12R-4 and the left audio signal to be output to the loudspeaker 12R-4 as listed in FIG. 5.

Processing proceeds to step S17 of FIG. 15. In step S17, the loudspeakers 12L, 12R and 12B emit respective sounds responsive to the audio signals adjusted in delay and volume level in accordance with the parameters optimum for the frequency of the input signal and the active screen.

The process of FIG. 19 is performed by the speaker engines 33-1 through 33-9 corresponding to the loudspeakers 12. When the screen GG1 of the display 11-1 is set as the active screen, the loudspeakers 12 output the sounds responsive to the audio signals that are adjusted in delay and volume level so that the sound image of the audio corresponding to the screen GG1 is localized on the sound image localization position P1 of FIG. 9. In this way, the sound is heard so that the sound image of the sound corresponding to the screen GG1 of the display 11-1 of FIG. 4 is localized on the screen GG1.

The audio signal process in step S16 of FIG. 15 is described below with reference to a flowchart of FIG. 18. The audio signal process is performed when one of the zoom screens of FIGS. 12 through 14 is set as the active screen. The audio signal process of FIG. 18 is performed by the audio signal processor 53 of FIG. 19.

FIG. 19 illustrates in detail the audio signal processor 53 that performs the audio signal process of FIG. 18. As shown in FIG. 19, the audio signal processor 53 includes the frequency analyzing unit 101, the delay adjuster 103 and the volume adjuster 104 as the audio signal processor 53 of FIG. 17. The audio signal processor 53 of FIG. 19 is different from the audio signal processor 53 of FIG. 17 in that the parameter memory 102 is replaced with a parameter memory 15.

The parameter memory 151 of FIG. 19 receives not only the active screen identification signal from the video engine 34 displaying the active screen but also the screen size signal via the main controller 32 and the controller 54.

The parameter memory 151 is identical in structure to the parameter memory 102. The parameter memory 151 selects the parameter group in response to the states of the video engines 34 and the state of the other speaker engines 33 supplied from the controller 54. The parameter memory 151 further selects, from the parameter group, parameters (such as a delay operation amount and a volume control operation amount) in accordance with the active screen identification signal and the screen size signal supplied from the controller 54 and the ratio of the low frequency component to the high frequency component contained in the frequency component from the frequency analyzing unit 101. In response to the selected parameters, the parameter memory 151 controls the delay adjuster 103 and the volume adjuster 104.

Returning to FIG. 18, the audio signal process of the audio signal processor 53 of FIG. 19 is discussed. Steps S51, S54 and S55 of FIG. 18 are respectively substantially identical to steps S31, S34 and S35 of FIG. 16, and the detailed discussion thereof is omitted as appropriate.

The input signal (audio signal) from the AD converter 52-1 is input to each of the frequency analyzing unit 101 and the delay adjuster 103. In step S51, the frequency analyzing unit 101 analyzes the frequency of the input signal and supplies the frequency component as the analysis result to the parameter memory 151.

In step S52, the parameter memory 151 supplies the active screen identification signal and the screen size signal from the main controller 32 displaying the active screen via each of the main controller 32 and the controller 54.

In step S53, the parameter memory 151 selects, from the parameter group selected in step S12 of FIG. 15, parameters corresponding to the frequency analysis result from the frequency analyzing unit 101, the active screen identification signal and the screen size signal. In the case of FIG. 12, namely, when the screen GC1 of the displays 11-1 through 11-9 is active, the parameters corresponding to the expansion screen GC1 are selected.

In step S54, the parameter memory 151 controls the delay adjuster 103, thereby causing the delay adjuster 103 to delay the input signal in response to the selected parameter. In the case of the loudspeakers 12L-5 and 12R-5 of FIG. 12, the delay adjuster 103 delays the left audio signal to be output to the loudspeaker 12L-5 and the right audio signal to be output to the loudspeaker 12R-5 by a small amount.

In step S55, the parameter memory 151 controls the volume adjuster 104, thereby causing the volume adjuster 104 to adjust the volume level of the delayed signal in response to the selected parameter and then outputs the volume controlled audio signal to each of the DA converter 55-1 and the DA converter 55-2. In the case of the loudspeakers 12L-5 and 12R-5 of FIG. 12, the volume adjuster 104 adjusts the left audio signal to be output to the loudspeaker 12L-5 and the right audio signal to be output to the loudspeaker 12R-5 to be a volume level higher than the standard volume level.

Processing proceeds to step S17 of FIG. 15. In step S17, the loudspeakers 12L, 12R and 12B emit respective sounds responsive to the audio signals adjusted in delay and volume level in accordance with the parameters optimum for the frequency of the input signal, the active screen and the screen size signal.

The process of FIG. 19 is performed by the speaker engines 33-1 through 33-9 corresponding to the loudspeakers 12. When the screen GC1 of the displays 11-1 through 11-9 is set as the active screen, the loudspeakers 12 output the sounds responsive to the audio signals that are adjusted in delay and volume level so that the sound image of the audio corresponding to the expansion screen GC1 responds to the center position and size of the expansion screen GC1. In this way, the sound is heard so that the sound image of the sound corresponding to the expansion screen GC1 of the displays 11-1 through 11-9 of FIG. 12 is localized on the expansion screen GC1.

In the multi-speaker system as described above, the speaker engines exchange information with each other, and perform audio signal process based on the received information. The number of outputs is modified in a scalable manner, and the audio signal process to the output is individually performed.

The speaker engine receives the sub channel audio signal different from the output audio signal. The process result of the sub channel audio signal is accounted for in the audio signal process. If a quick report is detected in the sub channel audio signal, the audio output can immediately switch to the sub channel program. By transmitting the process result to the video engine, the video output can also be switched to the sub channel audio signal.

Since the loudspeakers 12 forming the multi-speaker 2 are arranged to surround the display screen of the multi-display apparatus 1 from above, below and sideways, the sound image may be localized to any position wherever the active screen may shift within the display screen. The user can intuitively recognize the position of the active screen.

The sound image may be localized at the center of a circle or along the circle surrounding the display screen of the multi-display apparatus 1 (all screens G1 through G9) in the multi-speaker system. Even if the displays are arranged close to each other, the user can still recognize the shifting of the active screen.

In the multi-speaker system, the loudspeakers 12 are assigned the functions of sharp-focusing the sound image, soft-focusing the sound image, and providing reverberation and the delay operation and the volume control operation are performed in response to the number of displays and the zoom magnification (active screen size). The sound image can thus be localized at the center of the video regardless of the number of displays in use and the zoom magnification.

In the multi-speaker system, the frequency characteristics of the input signal are analyzed, and the delay operation and the volume control operation appropriate for the frequency analysis results are performed. This arrangement prevents the sound image localization from being dependent on the input signal.

The above-referenced series of process steps may be performed using hardware or software.

If the process steps are performed using software, a program of the software may be installed onto a computer built in dedicated hardware or a general-purpose personal computer enabled to perform a variety of functions with a variety of programs installed thereon.

FIG. 20 is a block diagram illustrating a personal computer 301 executing the above series of process steps. A central processing unit (CPU) 311 executes a variety of processes in accordance with a program stored on a read-only memory (ROM) 312 or a storage unit 318. A random-access memory (RAM) 313 stores a program to be executed by the CPU 201 and data, as necessary. The CPU 311, the ROM 312 and the RAM 313 are interconnected to each other via a bus 314.

The CPU 311 connects to an input-output interface 315 via the bus 314. The input-output interface 315 connects to an input unit 316 including a keyboard, a mouse and a microphone, and an output unit 317 including a display and a loudspeaker. The CPU 311 executes a variety of processes in response to a command input via the input unit 316. The CPU 311 outputs the process results to the output unit 317.

The storage unit 318 connected to the input-output interface 315 includes a hard disk, for example, and stores the program to be executed by the CPU 311 or a variety of data. A communication unit 319 communicates with an external device via a network such as the Internet or a local area network.

The program may be acquired via the communication unit 319 and then stored on the storage unit 318.

When loaded with a removable medium 321 such as one of a magnetic disk, an optical disk, a magneto-optical disk, and a semiconductor memory, a drive 320 connected to the input-output interface 315 drives the removable medium 321 to acquire the program and data stored thereon. The acquired program and data are transferred to the storage unit 318 for storage as necessary.

As shown in FIG. 20, the program recording media storing the program to be installed onto the computer and to be executed by the computer may be the removable medium 321. The removable medium 321 may be a package medium including one of a magnetic disk (flexible disk), an optical disk (compact-disk read-only memory (CD-ROM), digital versatile disk (DVD) or the like), a magneto-optical disk, and a semiconductor memory. The program recording media also include the ROM 312 or a hard disk forming the storage unit 318, each temporarily or permanently storing the program. Storage of the program onto the program recording medium is performed via the communication unit 319 such as a router, a modem, using a wired or wireless communication medium such as a local area network, the Internet, and a digital broadcasting satellite.

The process steps described in this specification is performed in the time-series order sequence as previously stated. Alternatively, the process steps may be performed in parallel or separately.

The word system in this specification refers to a logical set of a plurality of apparatuses, and is not limited to a single-housing apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An output control system including a plurality of output control apparatuses, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus, each of the output control apparatuses comprising:

communication means for exchanging information with another output control apparatus and with display control apparatuses; and signal processing means for processing an audio signal to be output to a corresponding loudspeaker based on information relating to the other output control apparatus and at least one of the display control apparatuses received via the communication means, wherein the display control apparatuses control image display on the plurality of displays of the multi-display apparatus.

2. The output control system according to claim 1, wherein each of the output control apparatuses comprises:

first signal input means for inputting the audio signal to be output to the corresponding loudspeaker;

second signal input means for inputting an audio signal other than the audio signal to be output to the corresponding loudspeaker; and detecting means for detecting a feature of the audio signal input by the second signal input means, wherein the signal processing means processes the audio signal input by the second signal input means based on the detection result of the feature of the audio signal detected by the detecting means and outputs the processed audio signal to the corresponding loudspeaker.

3. The output control system according to claim 2, wherein the communication means transmits the detection result of the feature of the audio signal detected by the detecting means to the plurality of display control apparatuses.

4. The output control system according to claim 1, wherein the signal processing means processes the audio signal to be output to the corresponding loudspeaker so that a sound image of a sound corresponding to an image to be displayed on one of the plurality of displays forming the multi-display apparatus is localized on a center position of or along a circle centered on the center position of the display screen of the multi-display apparatus.

5. The output control system according to claim 1, wherein the signal processing means processes the audio signal to be output to the corresponding loudspeaker so that a sound image of a sound corresponding to an image to be displayed on the multi-display apparatus is localized at any position on a display screen of the multi-display apparatus.

6. The output control system according to claim 5, wherein the signal processing means processes the audio signal to be output to the corresponding loudspeaker so that a sound image of a sound corresponding to an image to be displayed on at least two of the plurality of displays forming the multi-display apparatus is localized on a localization position responsive to a size of an image to be displayed on the at least two displays.

7. The output control system according to claim 5, wherein each of the loudspeakers is assigned to provide a different effect to a sound image of a sound responsive to an image to be displayed on the multi-display apparatus, and
wherein the signal processing means processes the audio signal to be output to the corresponding loudspeaker in accordance with an effect set to the corresponding loudspeaker.

8. The output control system according to claim 7, wherein the corresponding loudspeaker is assigned an effect of sharp-focusing the sound image.

9. The output control system according to claim 7, wherein the corresponding loudspeaker is assigned an effect of soft-focusing the sound image.

10. The output control system according to claim 7, wherein the corresponding loudspeaker is assigned a reverberation effect.

11. An output control method of an output control system including a plurality of output control apparatuses, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus, the method comprising steps of:
exchanging information with another output control apparatus and with display control apparatuses; and
processing an audio signal to be output to the corresponding loudspeaker based on received information relating to the other output control apparatus and at least one of the display control apparatuses,
wherein the display control apparatuses control image display on the plurality of displays of the multi-display apparatus.

12. An output control apparatus of a plurality of output control apparatuses forming an output control system, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus,
the output control apparatus comprising:
communication means for exchanging information with another output control apparatus and with display control apparatuses; and
signal processing means for processing an audio signal to be output to the corresponding loudspeaker based on information relating to the other output control apparatus and at least one of the display control apparatuses received via the communication means,
wherein the display control apparatuses control image display on the plurality of displays of the multi-display apparatus.

13. An output control method of an output control apparatus of a plurality of output control apparatuses forming an output control system, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus, the method comprising:
exchanging information with another output control apparatus and with display control apparatuses; and
processing an audio signal to be output to a corresponding loudspeaker based on received information relating to the other output control apparatus and at least one of the display control apparatuses,
wherein the display control apparatuses control image display on the plurality of displays of the multi-display apparatus.

14. A non-transitory computer-readable medium encoded with computer-readable instructions thereon for causing an output control apparatus of a plurality of output control apparatuses forming an output control system to control outputting to a corresponding speaker, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus, the computer-readable instructions when executed by the output control apparatus cause the output control apparatus to perform a method comprising:
exchanging information with another output control apparatus and display control apparatuses; and
processing an audio signal to be output to a corresponding loudspeaker based on received information relating to the other output control apparatus and at least one of the display control apparatuses,
wherein the display control apparatuses control image display on the plurality of displays of the multi-display apparatus.

15. An output control system including a plurality of output control apparatuses, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus,
each of the output control apparatuses comprising:
a communication unit apparatus configured to exchange information with another output control apparatus and display control apparatuses; and
a signal processing unit apparatus configured to process an audio signal to be output to a corresponding loudspeaker based on information relating to the other output control apparatus and to at least one display control apparatus received via the communication unit apparatus,
wherein the display control apparatuses control image display on the plurality of displays of the multi-display apparatus.

16. An output control apparatus of a plurality of output control apparatuses forming an output control system, the output control apparatuses controlling audio signals supplied to respective two-dimensionally arranged loudspeakers, including at least two loudspeakers in a vertical direction, and at least two loudspeakers in a horizontal direction, the audio signals respectively corresponding to images displayed on an array of a plurality of displays forming a multi-display apparatus,
the output control apparatus comprising:
a communication unit apparatus configured to exchange information with another output control apparatus and display control apparatuses; and a signal processing unit apparatus configured to process an audio signal to be output to a corresponding loudspeaker based on information relating to the other output control apparatus and at least one display control apparatus received via the communication unit, wherein the display control apparatuses control image display on the plurality of displays of the multi-display apparatus.

* * * * *